(12) United States Patent
Hermans et al.

(10) Patent No.: US 11,083,999 B2
(45) Date of Patent: Aug. 10, 2021

(54) METHOD FOR PREPARING AN ASYMMETRIC MEMBRANE

(71) Applicant: Katholieke Universiteit Leuven, Leuven (BE)

(72) Inventors: Sanne Hermans, Mechelen (BE); Ivo Vankelecom, Oud-Heverlee (BE); Annelies Van Sieleghem, Heverlee (BE)

(73) Assignee: Katholieke Universiteit Leuven, Leuven (BE)

(*) Notice: Subject to any disclaimer, the term of this patent is extended or adjusted under 35 U.S.C. 154(b) by 474 days.

(21) Appl. No.: 15/579,669

(22) PCT Filed: Jun. 6, 2016

(86) PCT No.: PCT/BE2016/000024
§ 371 (c)(1),
(2) Date: Dec. 5, 2017

(87) PCT Pub. No.: WO2016/191832
PCT Pub. Date: Dec. 8, 2016

(65) Prior Publication Data
US 2018/0169587 A1 Jun. 21, 2018

(30) Foreign Application Priority Data
Jun. 5, 2015 (GB) .................................... 1509794

(51) Int. Cl.
*B29C 39/02* (2006.01)
*B01D 67/00* (2006.01)
(Continued)

(52) U.S. Cl.
CPC ...... *B01D 67/0013* (2013.01); *B01D 67/0011* (2013.01); *B01D 67/0016* (2013.01);
(Continued)

(58) Field of Classification Search
CPC .... B01D 69/02; B01D 69/12; B01D 2323/30; B01D 2323/42; B01D 2325/023;
(Continued)

(56) References Cited

U.S. PATENT DOCUMENTS

| 3,133,132 A | 5/1964 | Loeb et al. |
| 3,556,305 A | 1/1971 | Shorr |

(Continued)

FOREIGN PATENT DOCUMENTS

| GB | 2000720 A | 1/1979 |
| WO | 2010/111755 A2 | 10/2010 |

OTHER PUBLICATIONS

International Search Report pertaining to International Application No. PCT/BE2016/000024, filed Jun. 6, 2016, 6 pages.
(Continued)

*Primary Examiner* — Jeffrey M Wollschlager
*Assistant Examiner* — Xue H Liu
(74) *Attorney, Agent, or Firm* — Dinsmore & Shohl LLP

(57) ABSTRACT

The present invention provides a method for the preparation of an asymmetric membranes. More particularly, the new method relates to the use of a crosslinker contacted via vapour or liquid phase with the surface layer of a cast polymer film, followed by the immersion of said film in a coagulation bath. The formation of a crosslinked skin layer and the solidification of the membrane bulk can thus be decoupled in time.

13 Claims, 10 Drawing Sheets

Figure 1:
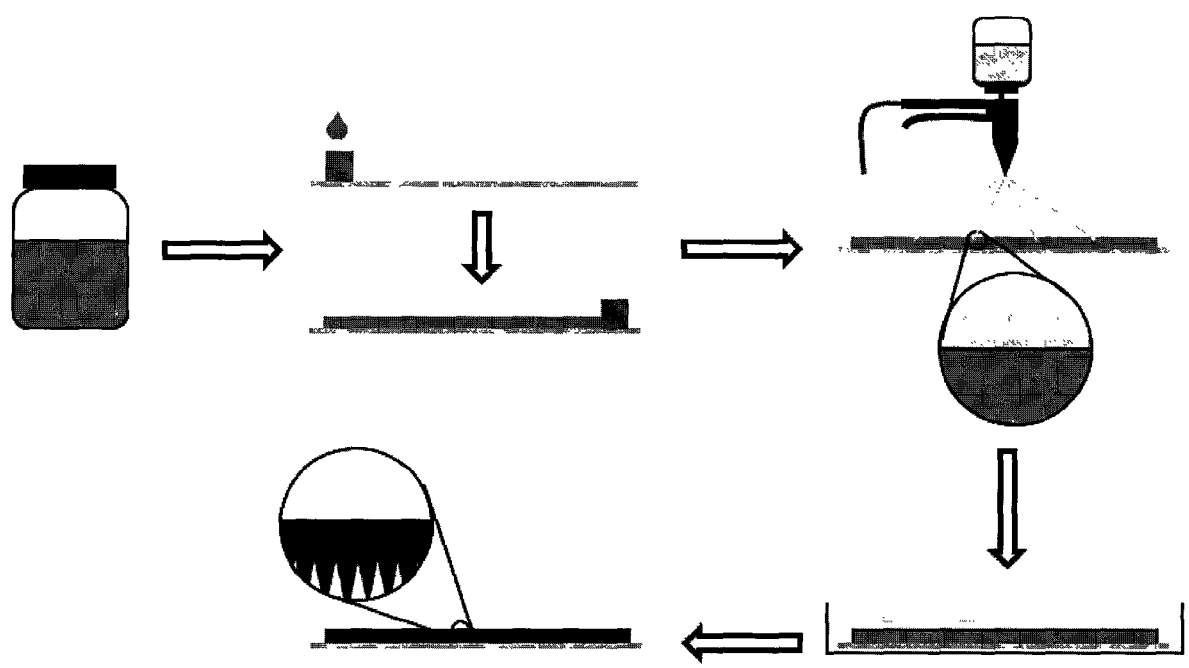

(51) Int. Cl.
  *B01D 69/12* (2006.01)
  *B01D 69/02* (2006.01)
  *B29C 39/12* (2006.01)
  *B29C 39/00* (2006.01)

(52) U.S. Cl.
  CPC .............. *B01D 69/02* (2013.01); *B01D 69/12* (2013.01); *B29C 39/003* (2013.01); *B29C 39/006* (2013.01); *B29C 39/02* (2013.01); *B29C 39/026* (2013.01); *B29C 39/12* (2013.01); *B29C 39/123* (2013.01); *B01D 2323/30* (2013.01); *B01D 2323/42* (2013.01); *B01D 2325/023* (2013.01)

(58) Field of Classification Search
  CPC ..... B29C 39/003; B29C 39/006; B29C 39/02; B29C 39/12; B29C 39/026
  USPC .................................................. 264/41, 212
  See application file for complete search history.

(56) References Cited

U.S. PATENT DOCUMENTS

| | | | |
|---|---|---|---|
| 3,567,810 A | 3/1971 | Baker | |
| 3,615,024 A | 10/1971 | Michaels | |
| 3,744,642 A | 7/1973 | Scala et al. | |
| 4,029,582 A | 6/1977 | Ishii et al. | |
| 4,188,354 A | 2/1980 | Munari et al. | |
| 4,277,244 A | 7/1981 | Bugaut et al. | |
| 4,666,996 A | 5/1987 | Sansone | |
| 4,950,404 A | 8/1990 | Chau | |
| 6,946,015 B2 | 9/2005 | Jorgensen et al. | |
| 6,986,844 B2 | 1/2006 | Barss et al. | |
| 6,997,971 B1 | 2/2006 | Young et al. | |
| 2004/0023017 A1* | 2/2004 | Nagoya | B01D 67/0011 428/310.5 |
| 2014/0231722 A1 | 8/2014 | Wu | |

OTHER PUBLICATIONS

Written Opinion pertaining to International Application No. PCT/BE2016/000024, filed Jun. 6, 2016, 5 pages.
Vanherck, et al., A simplified diamine crosslinking method for PI nanofiltration membranes, Journal of Membrane Science, May 2010, vol. 353, No. 1-2, pp. 135-143, Elsevier BV, Netherlands.
Hermans, et al., Efficient synthesis of interfacially polymerized membranes for solvent resistant nanofiltration, Journal of Membrane Science, Feb. 2015, vol. 476, No., pp. 356-363, Netherlands.
Vanherck, et al., Crosslinking polyimides for membrane applications: A review, Progress in Polymer Science, vol. 38, No. 6, Nov. 20, 2012, pp. 874-896, Oxford, Great Britain.
Bolto, et al., Crosslinked poly(vinyl alcohol) membranes, Progress in Polymer Science, vol. 34, 2009, pp. 969-981, Victoria, Australia.
Taguet, et al., Crosslinking of Vinylidene Fluoride-Containing Fluoropolymers, Advance in Polymer Science, Springer Verlag, 2005, vol. 184, pp. 127-211, France.
Petersen, Composite Reverse Osmosis and Nanofiltration Membranes, Journal of Membrane Sciences, vol. 83, 1993, pp. 81-150, USA.
Hendrix, et al., Crosslinking of modified poly (ether ether ketone) membranes for use in solvent resistant nanofiltration, Journal of Membrane Science, vol. 447, 2013, pp. 212-221, Belgium.
Solomon, et al., High flux membranes for organic solvent nanofiltration (OSN)—Interfacial polymerization with solvent activation, Journal of Membrane Science, vol. 423-424, 2012, pp. 371-382, England.
Vandezande, et al., Solvent Resistant Nanofiltration: Separating On A Molecular Level, Critical Review, Chemical Society Reviews, www.rsc.org/csr, The Royal Society of Chemistry, 2008, vol. 37, pp. 365-405, Great Britain.
Mulder, Basic Principles of Membrane Technology, Second Edition, Kluwer Academi Publishers, 1996, pp. 1-577.

* cited by examiner

METHOD FOR PREPARING AN ASYMMETRIC MEMBRANE

FIELD OF THE INVENTION

The present invention relates to a method for the preparation of asymmetric membranes. More particularly, the new method relates to the use of a reactive monomer, typically a crosslinker, contacted via vapour or liquid phase with the surface layer of a cast polymer solution film, followed by its immersion in a coagulation bath. The formation of a cross-linked skin layer and the solidification of the membrane bulk can thus be decoupled.

BACKGROUND OF THE INVENTION

Membrane processes still gain importance in the field of the separation industry. Membranes act as a selective barrier that allow certain compounds to pass, i.e. the permeate, while other compounds are retained, i.e. the retentate. They can be applied in the separation of a range of components of varying molecular weights in gas or liquid phases. This is including but not limited to nanofiltration, desalination and water treatment. The main advantage of membrane technology is its environmentally friendly character, due to reduced energy consumptions in comparison with most conventional separation technologies, e.g. distillation and extraction. Other typical advantages are the possibility for continuous separation, the easy combination with other processes, the mild separation conditions, adjustable membrane properties, no need for additives and easy up-scaling (Marcel Mulder, *Basic Principles of Membrane Technology*, 1996.).

Membrane separation processes are widely applied in the filtration of aqueous fluids (e.g. desalination and wastewater treatment). However, the industrial implementation in organic solvents and gas treatment is rather limited despite the great potential of these techniques for the industry. This is mainly due to the relatively poor performance and/or stability of the membranes in organic solvent or gas mixture environments, respectively.

Many membranes for aqueous applications (e.g. desalination membranes, nanofiltration membranes) are asymmetric membranes which can be made by phase-inversion or interfacial polymerisation (IFP). The phase-inversion technique is well known to those skilled in the art and was first described in U.S. Pat. No. 3,133,132 for the preparation of a reverse-osmosis membrane. Since U.S. Pat. No. 3,133,132 the method has been further improved and currently most types of commercial membranes, including ultrafiltration, microfiltration and gas separation membranes, are manufactured by this phase-inversion method. The term "phase-inversion" refers to the controlled transformation of a thermodynamically stable polymer solution to a solid phase (membrane) by liquid-liquid demixing. This can be carried out by immersion of the cast polymer solution in a coagulation bath comprising a non-solvent for the polymer (immersion precipitation), possibly following a (short) solvent evaporation step during which asymmetry is already induced; or by contacting the cast polymer solution with a vapour phase comprising a non-solvent for the polymer; or by thermal precipitation; or by evaporation of the solvent.

The IFP technique is well known to those skilled in the art (Robert J. Petersen, 'Composite Reverse Osmosis and Nanofiltration Membranes', *Journal of Membrane Science*, 83 (1993), 81-150.). The procedures of U.S. Pat. Nos. 3,744, 642 and 4,277,244 and 4,950,404 are illustrative of the fundamental method for preparing membranes via IFP. In this technique, an aqueous solution of a reactive monomer (often a polyamine (e.g. a diamine)) is first deposited in the pores of a microporous support membrane (e.g. a polysulfone ultrafiltration membrane)—this step is also referred to as support membrane impregnation. Afterwards, the impregnated porous support membrane with the first monomer is immersed in a water-immiscible, organic solvent containing a second reactive monomer (e.g. a tri- or diacid chloride). The two monomers react at the interface of the two immiscible solvents due to differences in partition coefficients of the monomers in the two solvents. After film formation a diffusion barrier for monomer transport exists and the reaction is completed to form a highly cross-linked thin film which remains attached to the support membrane. Since membranes synthesized via this technique intrinsically have a very thin top layer, high permeances are expected.

Asymmetric membranes formed by phase-inversion or IFP are often used for nanofiltration or reversed osmosis applications. Nanofiltration applications have gained attention based on the relatively low operating pressures, high fluxes and low operation and maintenance costs associated therewith. Nanofiltration is a membrane process utilizing membranes of molecular weight cut-off in the range of 200-1,000 Daltons. Nanofiltration has been widely applied to filtration of aqueous fluids, but due to a lack of suitable solvent stable membranes, it has not been widely applied to the separation of solutes in organic solvents. This is despite the fact that solvent resistant nanofiltration (SRNF) has many potential applications in food, pharmaceutical and chemical industry for example in solvent exchange, catalyst recovery and recycling, purifications, and concentrations (Pieter Vandezande, Lieven E M Gevers and Ivo F J Vankelecom, 'Solvent Resistant Nanofiltration: Separating on a Molecular Level.', *Chemical Society reviews*, 37 (2008), 365-405.). Often symmetric dense membranes are used for gas separation, but also asymmetric membranes with a sufficiently dense toplayer can be applied herein. Gas separation is a membrane process utilizing membranes to separate certain gas streams in a permeate stream and a retentate stream based on molecular weight and/or affinity differences. These gas separation processes might help to reduce global warming and shortages in energy supplies by their possible applications in $CO_2$ capture from flue gasses, preparation of biogas or cleaning of shale and natural gas.

SUMMARY OF THE INVENTION

The present invention provides a method for the preparation of asymmetric membranes via an altered phase-inversion process in which a reactive species is brought in contact with the surface of the cast polymer film. The reactive species can be introduced via a liquid phase on the cast film, or can be vaporised above it. The reaction can take place with a polymer present in the casting solution, possibly the membrane forming polymer itself, or can take place with a second reactive monomer present in the casting solution, for instance to realise an interfacial polymerisation (IFP). Crosslinking of the toplayer is then followed by the solidification of the rest of the membrane, for instance by immersion in a coagulation bath, resulting in the final said asymmetric membrane, which can then still be further crosslinked in the bulk to provide extra solvent stability during subsequent applications.

The present invention more particularly provides a method for the preparation of asymmetric membranes by phase-inversion comprising the following steps: (a) casting of the polymer dope solution; (b) contacting the said cast polymer film with a reactive solution via (i) liquid phase or (ii) vapour phase contact; (c) immersing the said polymer film in a coagulation bath in which phase-inversion occurs, resulting in the final said asymmetric membrane, possibly followed by a further bulk polymerisation.

Alternatively, the invention can be described as a method for the preparation of an asymmetric membrane comprising a less porous top-layer as compared to the underlying membrane structure, wherein said method comprises following steps:
  a. preparing a liquid or gas phase comprising a first reactive monomer;
  b. casting a solution of a first polymer wherein said first polymer can be crosslinked by said first reactive monomer and/or wherein said first polymer solution optionally comprises a second reactive monomer that can react with said first reactive monomer in order to form a second polymer material;
  c. forming said less porous top-layer by contacting the upper layer of said cast first polymer solution with the first reactive monomer, wherein said first reactive monomer is contained in a vapour or liquid phase and wherein upon contact between said first reactive monomer and the upper layer of said cast first polymer solution, said first reactive monomer reacts with the first polymer thus crosslinking said first polymer within said upper layer of the cast first polymer solution and/or in case of the presence of a second reactive monomer in the cast first polymer solution said first reactive monomer reacts with said second reactive monomer thus forming a second polymer within said upper layer of the cast first polymer solution;
  d. inducing phase inversion of the cast first polymer solution by immersing said cast polymer solution obtained in step c. in a non-solvent for said first polymer in order to obtain an asymmetric membrane comprising a less porous top-layer;
  e. optionally said method comprises additional steps for the further crosslinking of the membrane over its entire thickness, referred to as bulk crosslinking.

Within said method the cast polymer solution may comprise a first polymer selected from the group consisting of polyimide, poly(vinyl alcohol), polystyrene, polybenzimidazole, sulfonated polyether ether ketone, sulfonated polyether ketone, sulfonated polysulfone, hydrolysed polyacrylonitrile and wherein said crosslinking of reactive polymer in step b. by said first reactive monomer is of an ionic or a covalent nature. Furthermore, said first reactive monomer may be selected from the group consisting of 1,2-diaminoethane; 1,3-diaminopropane; diaminobutane; diaminopentane; diaminohexane; diaminoheptane; diaminooctane; diaminononane; diaminodecane; N,N'-dimethylethylenediamine; N,N'-diethylethylenediamine; diethylenetriamine; triethylenetetraamine; tetraethylenepentaamine; pentaethylenehexamine; tris(2-aminoethyl)amine; polyethyleneimine; polyallylamine; polyvinylamine; polyether diamines based predominantly on a polyethylene oxide backbone with a molecular weight of 50 to 20,000; trimethoxysilylpropyl-substituted polyethyleneamine having a molecular weight of 1,000 to 200,000; m-xylylenediamine; p-xylylenediamine; multifunctional aniline derivatives; phenylenediamines; methylenedianiline; oxydianiline; gluteraldehyde; formaldehyde; glyoxal; terphthaldehyde; acrolein; methacrolein; urea formaldehyde/$H_2SO_4$; citric acid; maleic acid and anhydride; maleic anhydride copolymers with vinyl methyl ether; maleic acid; malonic acid; fumaric acid; poly(acrylic acid); trimesic acid; trimesoyl chloride; toluene diisocyanate; glycidyl acrylate; divinyl sulphone; boric acid; 1,2-dibromoethane; tetraethoxysilane; γ-glycidoxypropyltrimethoxysilane; γ-mercaptopropyltrimethoxysilane and the like.

Within a method according to the present invention, the first reactive monomer and the reactive polymer can undergo a click-reaction. In a particular embodiment of the method of the present invention the first reactive monomer and the reactive polymer can form a polyamide.

Within a method according to the present invention, the first and the second reactive monomers can undergo a crosslinking reaction. In a particular embodiment of the method of the present invention the first and the second reactive monomers can form a polyamide.

In a particular embodiment of the present invention said optional further crosslinking of step e. comprises the bulk crosslinking by immersion of said asymmetric membrane obtained in step d. in a crosslinking solution, optionally followed by one or more solvent exchange steps, wherein said crosslinking solution comprises a third reactive monomer suitable for crosslinking said first polymer. In a more particular embodiment said crosslinking solution contains a crosslinker dissolved in a solution which is a non-solvent or a poor solvent for the said asymmetric membrane.

In another particular embodiment of the present invention, the non-solvent used for inducing phase inversion in step d contains a crosslinker for bulk crosslinking the asymmetric membrane parallel to the phase inversion, wherein said crosslinker is a third reactive monomer suitable for crosslinking said first polymer.

DETAILED DESCRIPTION

List of Figures

FIG. 1 Schematic representation of the proposed new method following the phase-inversion approach whereby a sprayed monomer reacts with a polymer to form the membrane matrix.

Figure 2:
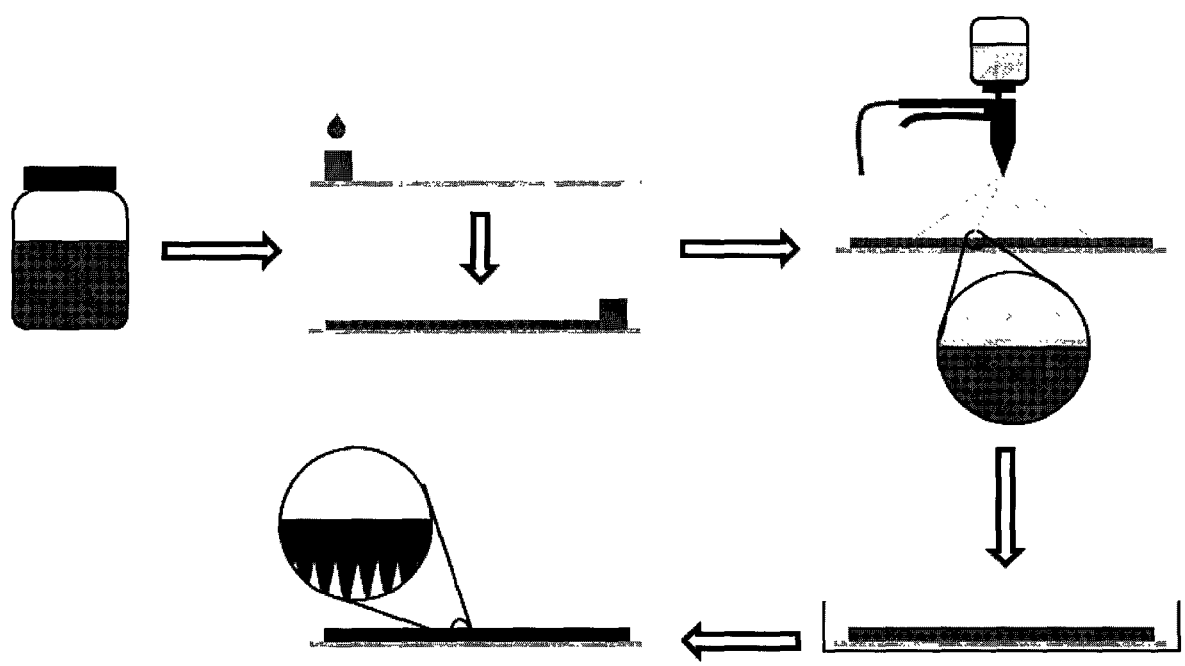

FIG. 2 Schematic representation of the proposed new method following the IFP approach whereby a sprayed monomer reacts with a second monomer added to the dope solution to form a crosslinked toplayer.

Figure 3:
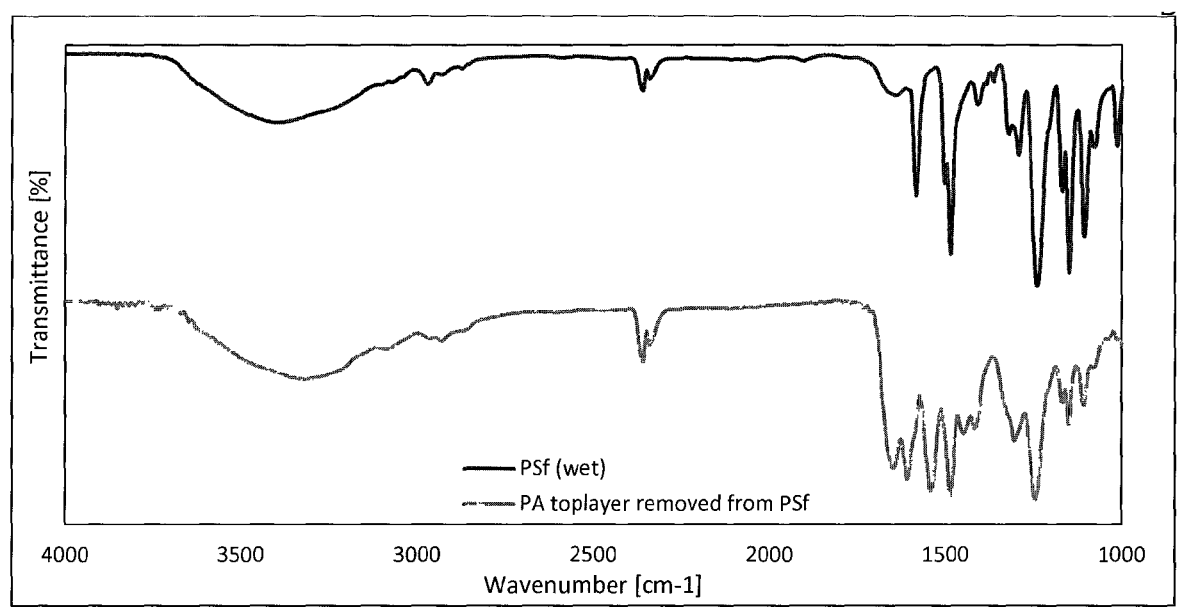

FIG. 3 ATR-FTIR spectra

Figure 4:
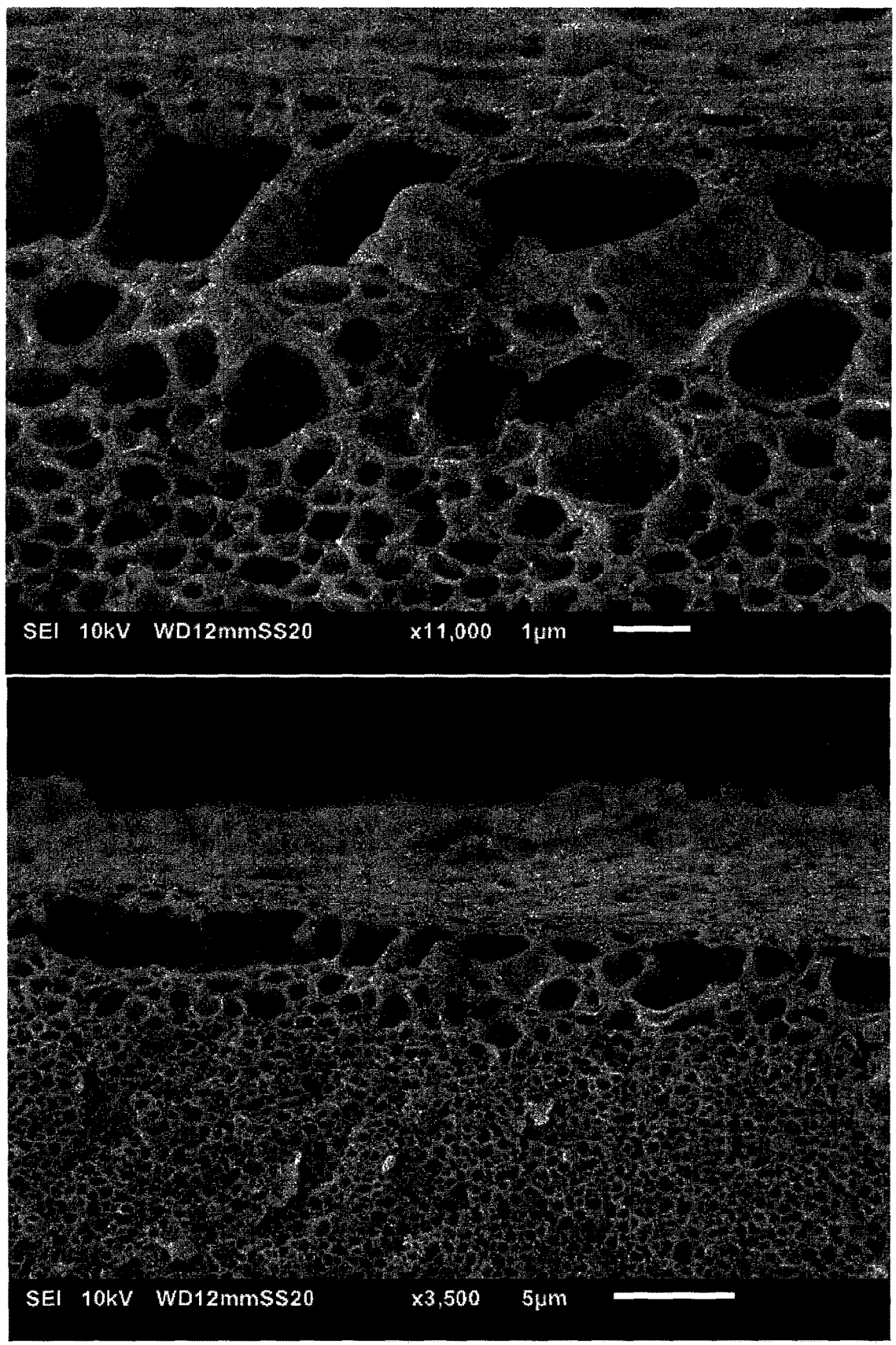

FIG. 4 SEM cross section (×11 000 and ×3 500) of membrane 8 used in Example 4 (2 wt % XDA 10 min reaction).

Figure 5:
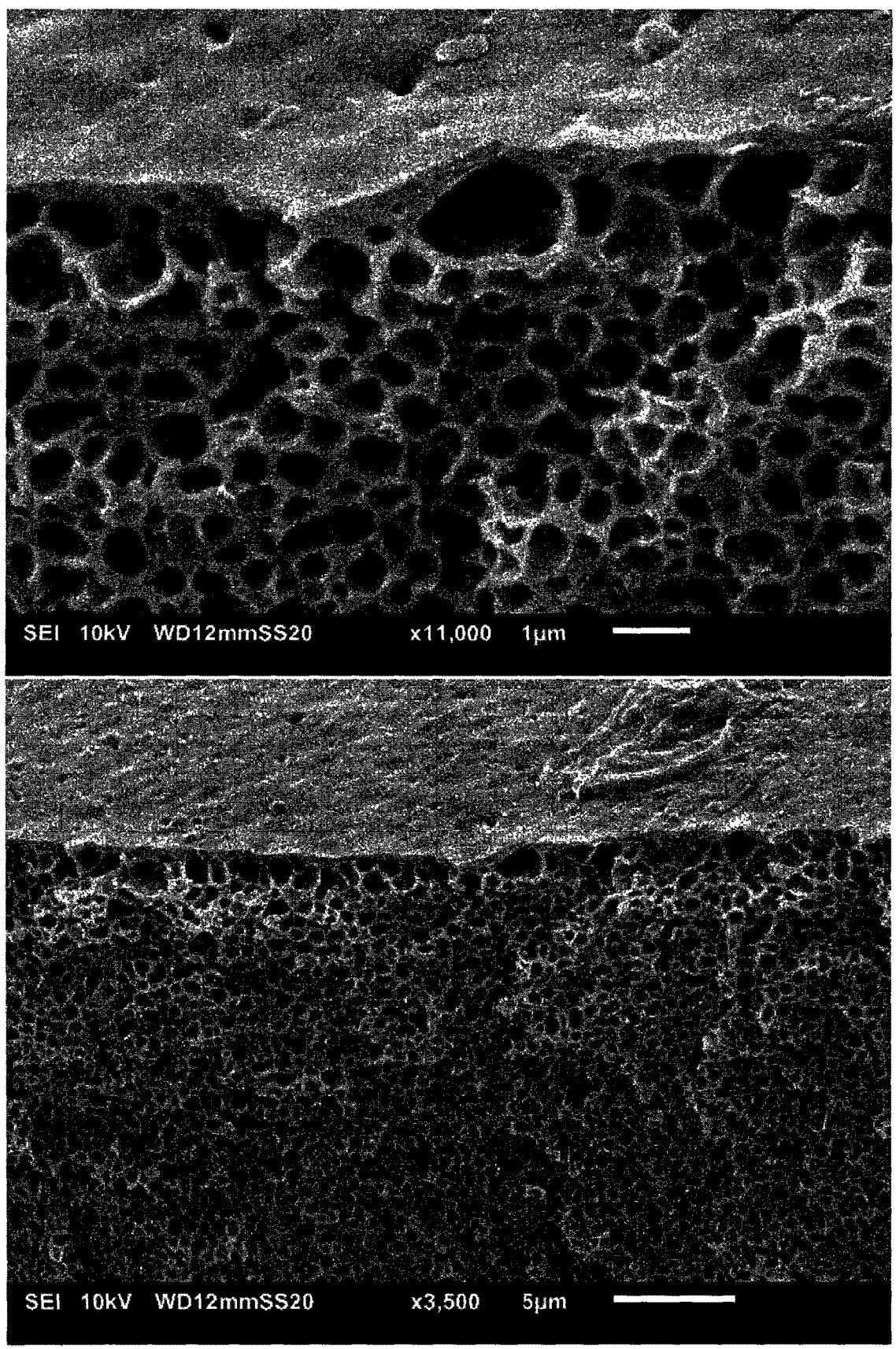

FIG. 5 SEM cross section (×11 000 and ×3 500) of membrane 7 used in Example 4 (5 wt % XDA 5 min reaction).

Figure 6:
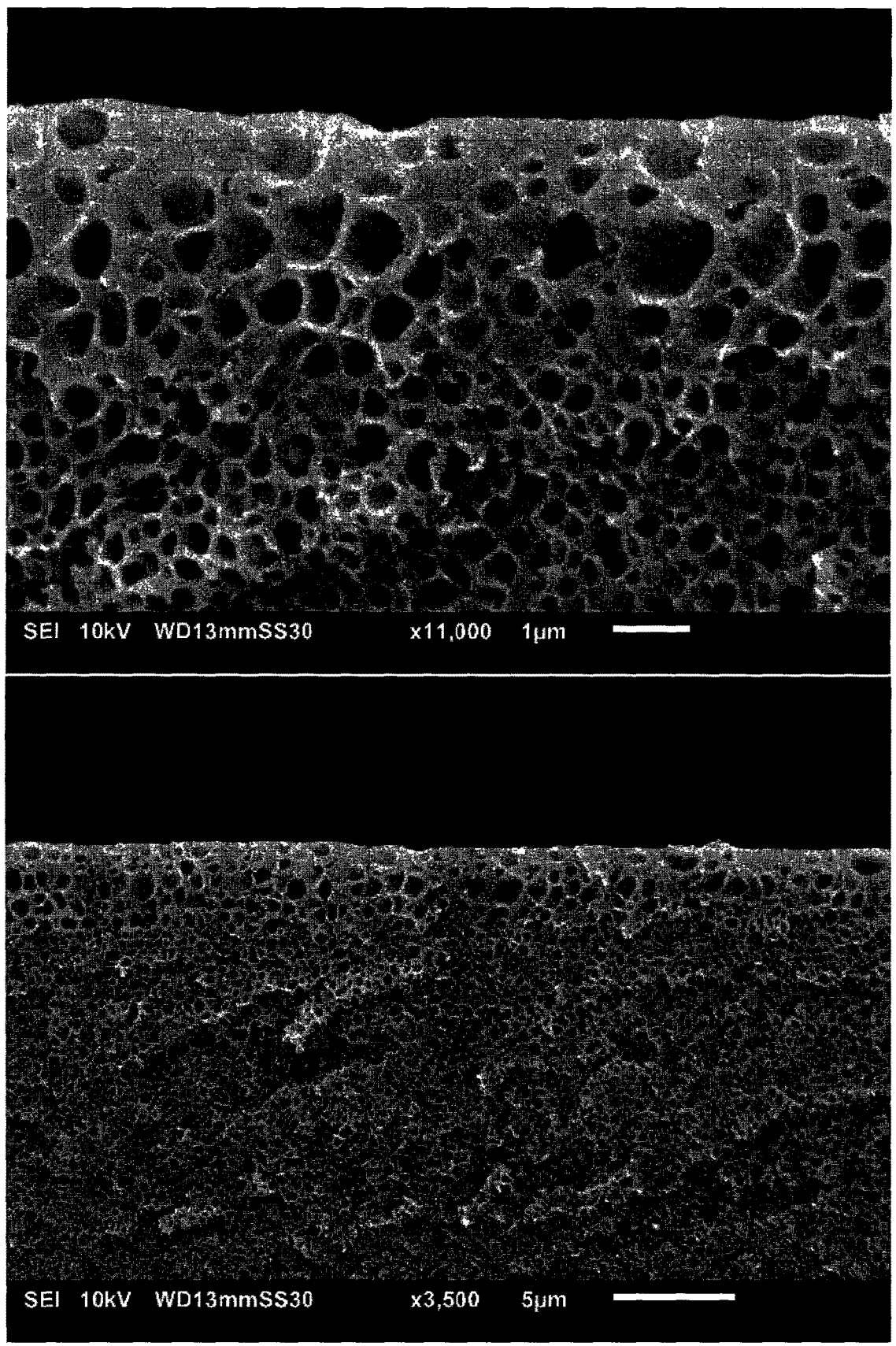

FIG. 6 SEM cross section (×11 000 and ×3 500) of membrane 5 used in Example 5 (2 wt % XDA 30 s spray).

Figure 7:
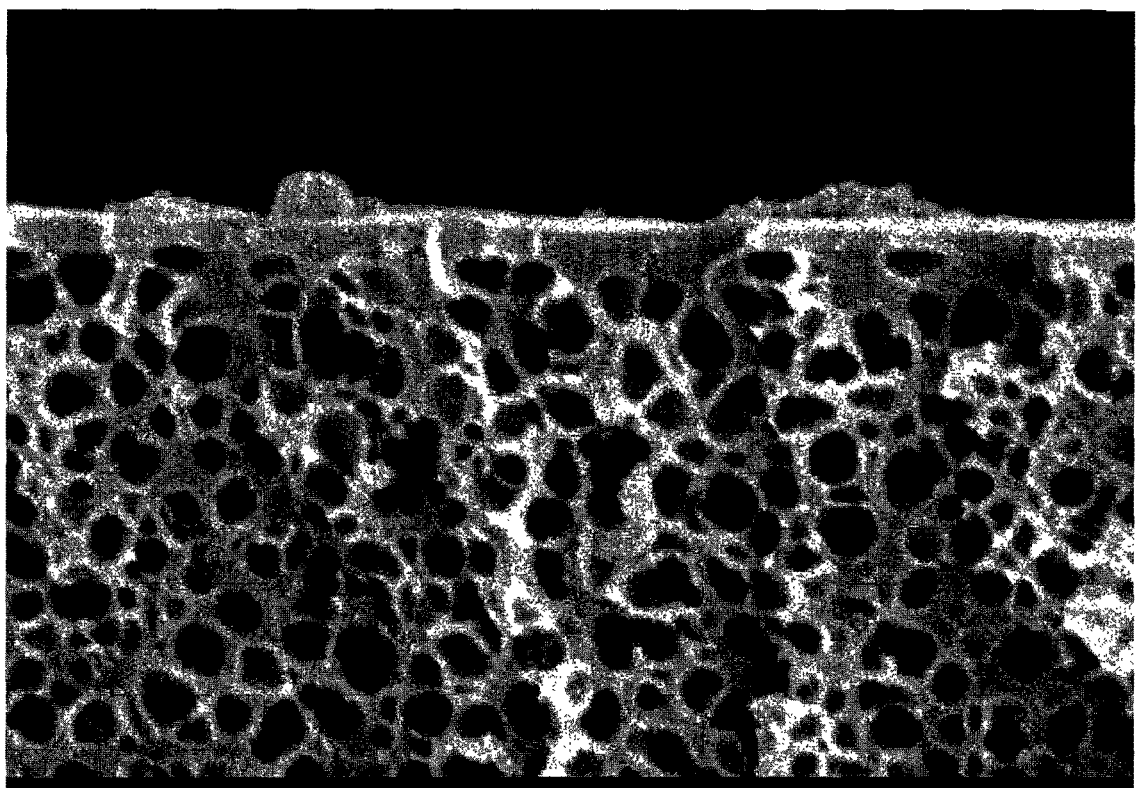
Figure 7:
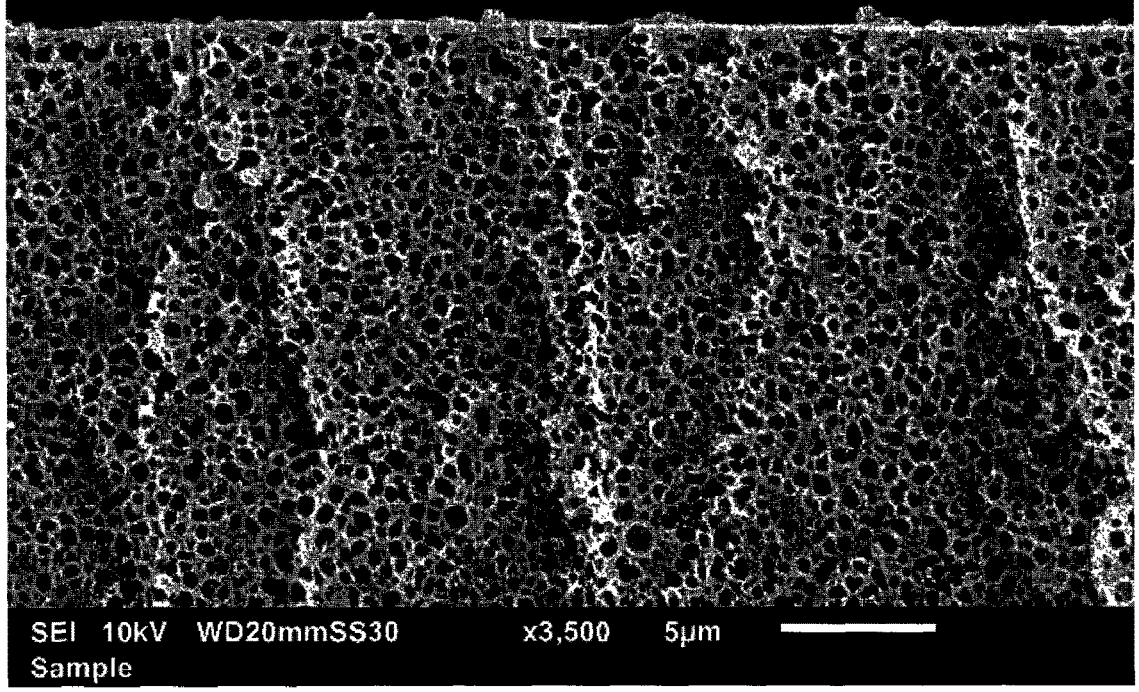

FIG. 7 SEM cross section (×11 000 and ×3 500) of membrane 5 used in Example 2 (2 wt % XDA at 1 bar).

Figure 8:
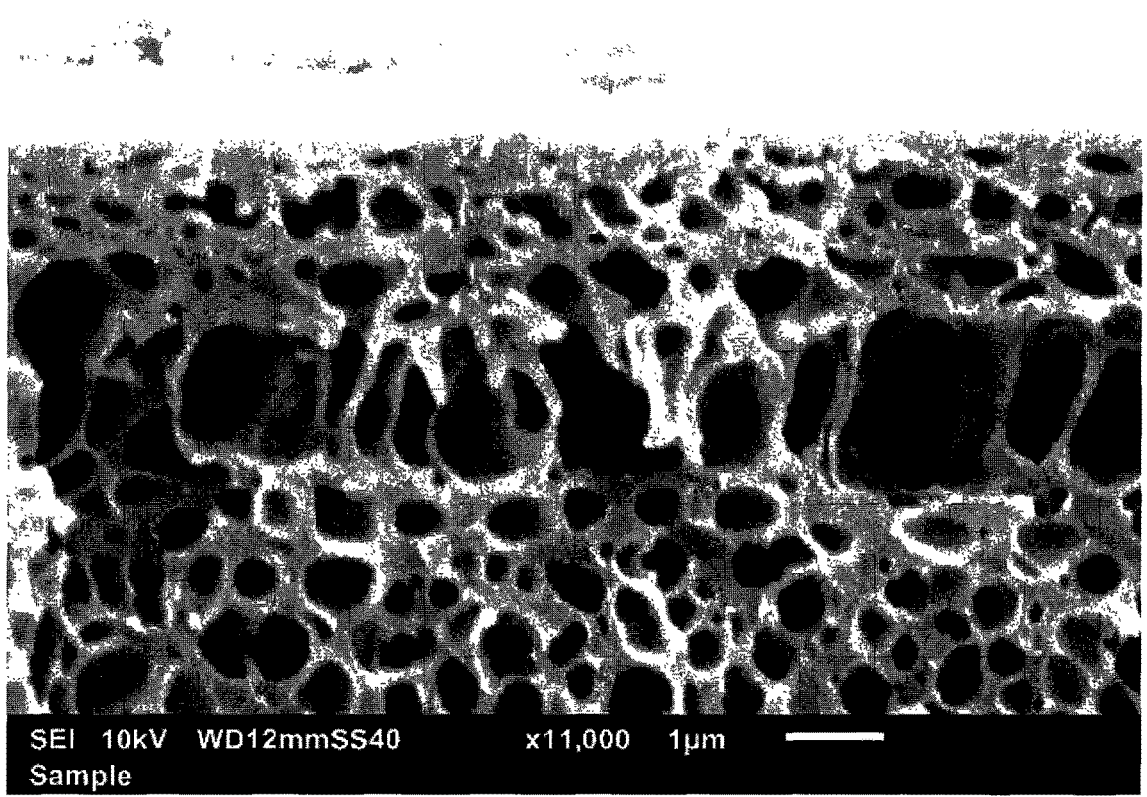
Figure 8:
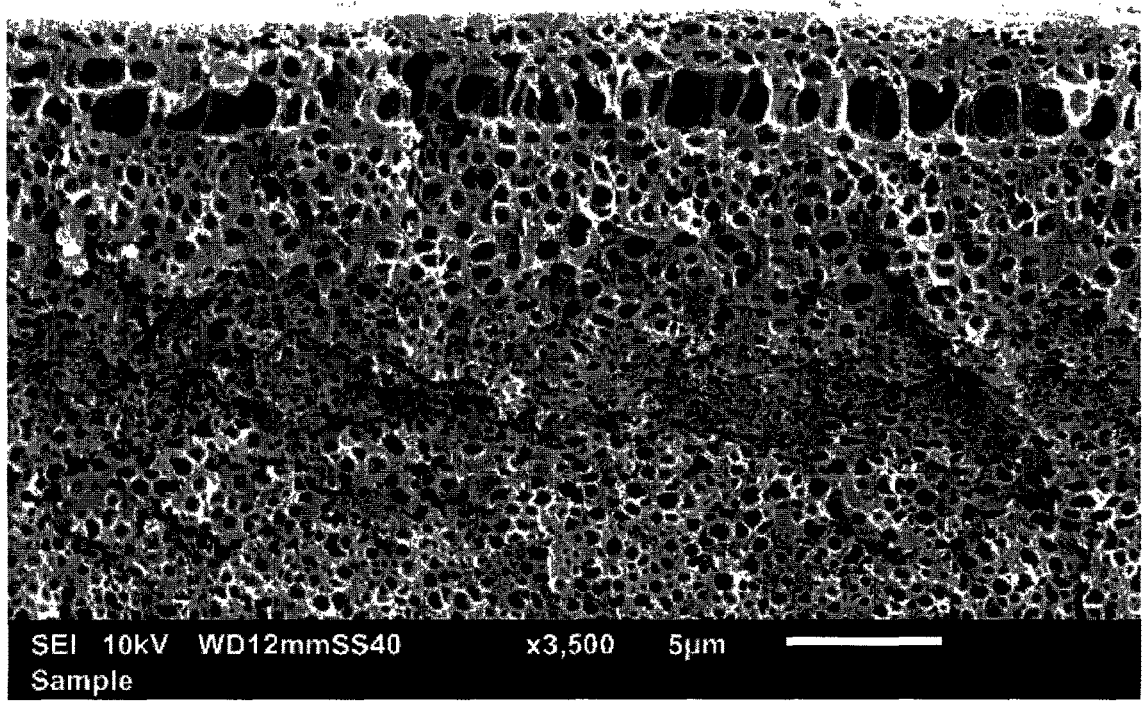

FIG. 8 SEM cross section (×11 000 and ×3 500) of membrane 2 used in Example 1 and membrane 1 used in Example 2 (Blanco at 0.5 bar).

Figure 9:
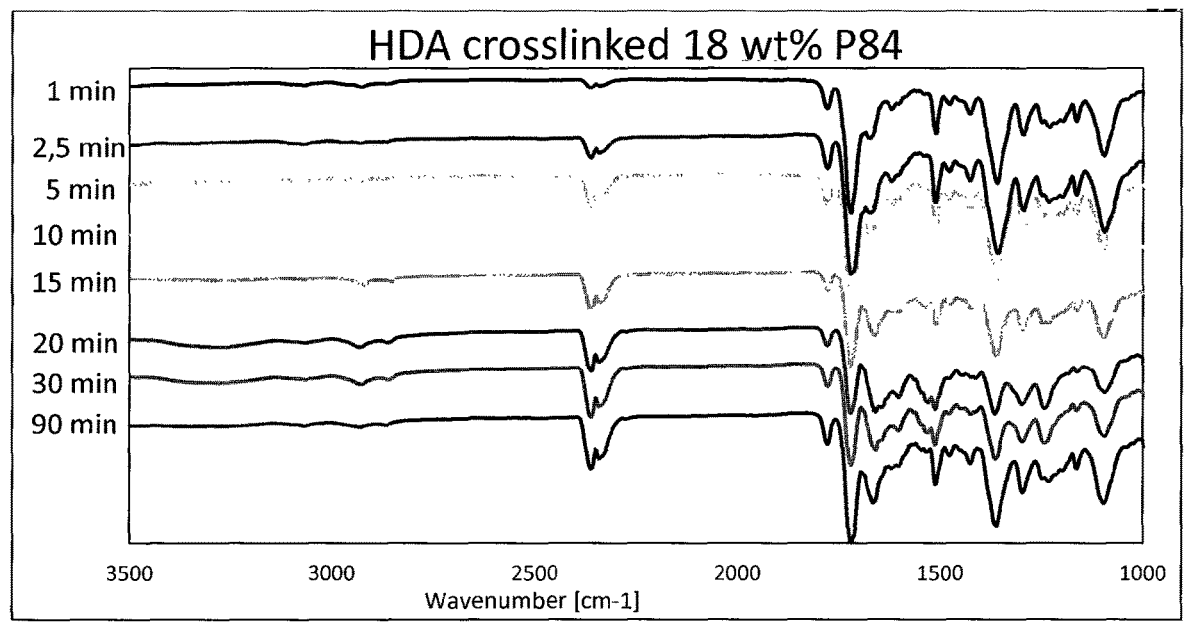

FIG. 9 ATR-FTIR data of HDA crosslinked membranes

Figure 10:
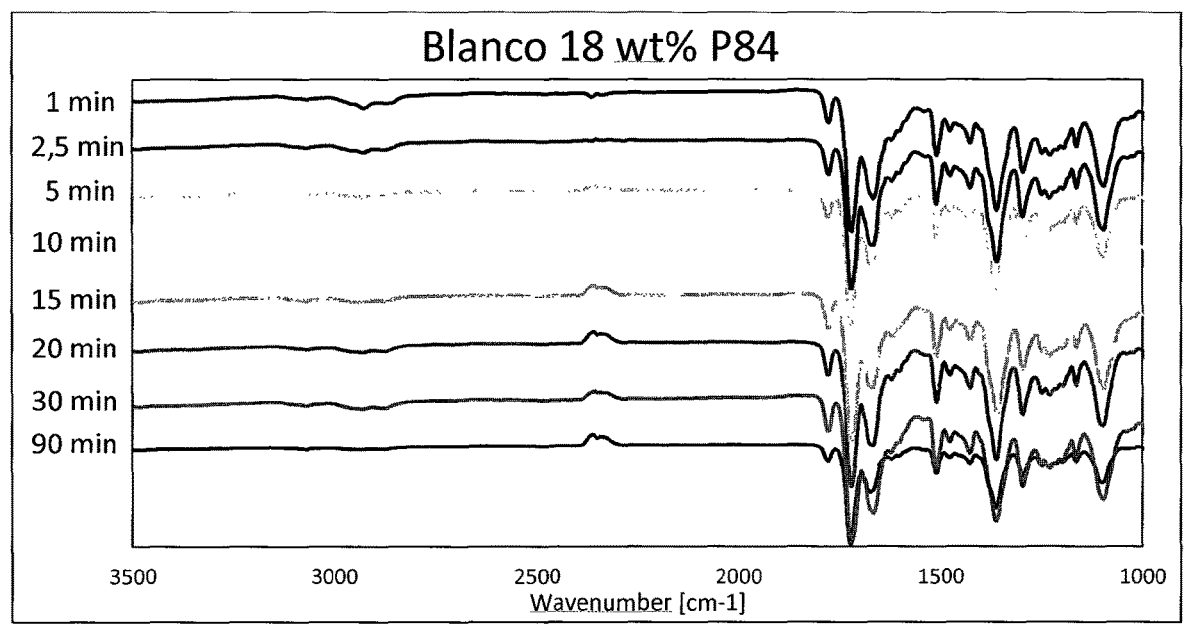

FIG. 10 ATR-FTIR data of blanco membranes

Figure 11:
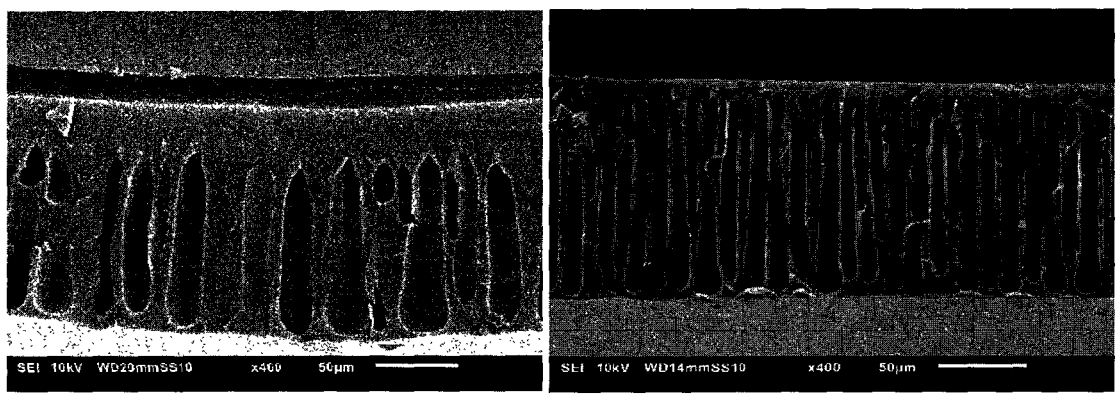

FIG. 11 SEM cross section (×400) of HDA crosslinked membrane (left) and blanco membrane (right) after 15 min of contact

DESCRIPTION

The scope of the applicability of the present invention will become apparent from the detailed description and drawings provided below. However, it should be understood that the detailed description and specific examples, while indicating preferred embodiments of the present invention, are given by way of illustration only since various changes and modifications within the spirit and scope of the invention will become apparent to those skilled in the art from this detailed description. Unless otherwise defined, all technical and scientific terms used herein have the same meaning as commonly understood by one of ordinary skill in the art to which this invention belongs.

The methods for preparing asymmetric membranes of the prior art, phase-inversion and interfacial polymerization as presently used, typically involve the induction of the asymmetry and the formation of a top-layer during or after the solidification of the support membrane. The present invention provides a novel method for the preparation of an asymmetric membrane, wherein the top-layer is formed in a crosslinking and/or polymerization reaction at the surface of a cast liquid polymer solution, this is prior to the solidification of said dissolved polymer. The formation of a top-layer via such polymerization or cross-linking reaction at the surface of the still liquid polymer solution allows for the preparation of asymmetric membranes having outstanding filtration performance with very high retentions and permeances. Therefore, it is an object of the present invention to provide a method for the preparation of an asymmetric membrane, wherein said membrane comprises a top-layer having a lower porosity as compared to that of the underlying membrane structure. Typically this method comprises following steps:
  a. preparing a liquid or gas phase comprising a first reactive monomer;
  b. casting a solution of a first polymer wherein said first polymer can be crosslinked by said first reactive monomer and wherein said first polymer solution optionally comprises a second reactive monomer that can react with said first reactive monomer in order to form a second polymer material. Preferably said second monomer does not react with said first polymer;
  c. contacting the upper layer of said cast first polymer solution with the first reactive monomer in order to form said top-layer, wherein said first reactive monomer is contained in a vapour or liquid phase and wherein upon contact between said first reactive monomer and the upper layer of said cast first polymer solution, said first reactive monomer reacts with the first polymer thus crosslinking said first polymer within said upper layer of the cast polymer solution and/or in case of the presence of a second reactive monomer in the cast first polymer solution said first reactive monomer reacts with said second reactive monomer thus forming a second polymer within said upper layer of the cast polymer solution;
  d. inducing phase inversion of the cast first polymer solution in order to obtain an asymmetric solidified membrane comprising a less porous top-layer. Preferably, said phase inversion is induced by immersing said cast polymer solution obtained in step (c) in a non-solvent for said first polymer in order to obtain an asymmetric membrane comprising a less porous top-layer; typically said non-solvent preserves the crosslinking bounds in said top-layer of the membrane as formed in step (c) and/or said non-solvent is also a non-solvent for the second polymer formed in said upper layer in step (c). Alternatively, said phase inversion is induced by contacting the cast polymer solution with a vapour phase comprising a non-solvent for the polymer or by thermal precipitation.

In case a liquid phase is prepared in step (a), said liquid phase typically comprises a solution of a first reactive monomer in a solvent, preferably an organic solvent. In particular said solvent is not a non-solvent for said first polymer. In case a gas phase is prepared in step (a), said gas phase typically comprises a vaporised first reactive monomer.

Optionally the method of the present invention comprises additional steps for the further crosslinking of the membrane over its entire thickness, referred to as bulk crosslinking.

In a first embodiment of the present invention, a phase-inversion approach is used whereby the top-layer of a cast and still liquid polymer film solution is crosslinked by liquid phase coating the upper layer of the said liquid polymer film with a crosslinker solution, wherein said crosslinker solution comprises a solution of a first reactive polyfunctional monomer (also referred to as crosslinker) dissolved in a solvent, preferably organic solvent. Typically, said solvent is not a non-solvent for the solubilized polymer in said cast polymer film solution. The said coated polymer film is subsequently immersed in a coagulation bath, comprising a non-solvent for the membrane forming polymer. More specifically, this method of the present invention for the preparation of asymmetric membranes using phase-inversion, comprises the following steps:
  a. Preparing a polymer dope solution by dissolving a membrane forming polymer, comprising reactive functional groups, in an appropriate solvent, preferably an organic solvent;
  b. Casting the said polymer dope solution into a still liquid polymer film;
  c. Coating the said cast and still liquid polymer film with a crosslinker solution of a reactive crosslinker in a solvent, preferably an organic solvent, to obtain a reaction at the surface of the said still liquid polymer film, resulting in a crosslinked and densified top-layer upon the said still liquid polymer film;
  d. Immersing the said still liquid polymer film with crosslinked top-layer into a coagulation bath, containing a non-solvent for the membrane forming polymer, to induce solidification, preferably complete solidification, of the said still liquid polymer film, resulting in a solidified membrane with crosslinked top-layer;
  e. (optional) If a crosslinked support membrane is desired via "sequential crosslinking": immersing the said solidified membrane with crosslinked top-layer in a solvent exchange medium comprising a solvent in which a crosslinker is solubilized and in which the said solidified membrane preferably swells, making the polymer chains more accessible for reaction with said crosslinker. Wherein said crosslinker is a reactive polyfunctional monomer suitable for crosslinking said membrane polymer.

Alternatively a crosslinked support membrane can be obtained using so called "simultaneous crosslinking", wherein in step (d) said still liquid polymer film is immersed in said solution comprising a non-solvent for said membrane forming polymer in which a membrane polymer crosslinker is dissolved. Wherein said crosslinker is a reactive polyfunctional monomer suitable for crosslinking said membrane polymer.

So in a first embodiment the present invention provides a method for the preparation of an asymmetric membrane, wherein said membrane comprises a top-layer having a lower porosity as compared to that of the underlying membrane structure and wherein said method comprises following steps:

a. preparing a liquid phase comprising a solution of a first reactive monomer in a solvent, preferably an organic solvent. Typically said solvent is not a non-solvent for the solubilized polymer of step b;

b. casting a solution of a polymer wherein said first polymer can be crosslinked by said first reactive monomer;

c. contacting the upper layer of said cast polymer solution with the first reactive monomer in order to form said top-layer, wherein said first reactive monomer is contained in said liquid phase of step (a) and wherein upon contact between said first reactive monomer and the upper layer of said cast polymer solution, said first reactive monomer reacts with the first polymer thus crosslinking said first polymer within said upper layer of the cast polymer solution. Preferably said liquid phase comprising said first reactive monomer is brought into contact with the upper layer of said cast polymer solution by atomizing said liquid phase of step (a) on said upper layer of the cast film;

d. inducing phase inversion of the cast first polymer solution in order to obtain an asymmetric solidified membrane comprising a less porous top-layer. Preferably, said phase inversion is induced by immersing said cast polymer solution obtained in step (c) in a non-solvent for said first polymer in order to obtain an asymmetric solidified membrane comprising a less porous top-layer. Typically, said non-solvent preserves the crosslinking bounds in said top layer of the membrane as formed in step (c). Alternatively, said phase inversion is induced by contacting the cast polymer solution with a vapour phase comprising a non-solvent for the polymer or by thermal precipitation.

Optionally said method comprises additional steps for further crosslinking of the membrane over its entire thickness, referred to as bulk crosslinking. Such bulk crosslinking may involve so called "sequential crosslinking" wherein the said solidified asymmetric membrane is immersed in a solvent exchange medium comprising a solvent in which a crosslinker is solubilized and in which the said assymetric membrane preferably swells, making all polymer chains accessible for said crosslinker. Wherein said crosslinker is a reactive polyfunctional monomer suitable for crosslinking said membrane polymer. Alternatively, said bulk cross-linking involves the use of "simultaneous crosslinking", wherein in step (d) said still liquid polymer film is immersed in said solution comprising a non-solvent for said membrane forming polymer in which a membrane polymer crosslinker is dissolved. Wherein said crosslinker is a reactive polyfunctional monomer suitable for crosslinking said membrane polymer.

Typically, an asymmetric membrane obtained according to this first embodiment of the invention is further treated in different rinsing and/or conditioning baths. Optionally, the resulting membrane is treated with an activating solvent.

In a second embodiment of the present invention, a phase-inversion approach is used whereby the top-layer of a cast and still liquid polymer film solution is crosslinked by contacting the upper layer of said liquid polymer film with a crosslinker in a vapour phase, wherein said crosslinker is a reactive polyfunctional monomer suitable for crosslinking the polymer in said cast solution. The said coated polymer film is subsequently immersed in a coagulation bath, comprising a non-solvent for the membrane forming polymer. More specifically, this method of the present invention for the preparation of asymmetric membranes using phase-inversion, comprises the following steps:

a. Preparing a polymer dope solution by dissolving a membrane forming polymer, comprising reactive functional groups, in an appropriate solvent, preferably an organic solvent;

b. Casting the said polymer dope solution into a still liquid polymer solution film;

c. Contacting the said cast and liquid polymer solution film with a reactive crosslinker vapour phase to obtain a reaction at the surface or upper layer of the said liquid polymer film, resulting in a crosslinked and densified top-layer upon the said still liquid polymer film;

d. Immersing the said still liquid polymer film with crosslinked top-layer into a coagulation bath, containing a non-solvent for said cast polymer, to induce solidification, preferably complete solidification, of the said still liquid polymer firm, resulting in a solidified membrane with crosslinked top-layer.

e. (optional) If a crosslinked support membrane is desired via "sequential crosslinking": immersing the said solidified membrane with crosslinked top-layer in a solvent exchange medium comprising a solvent in which a crosslinker is solubilized and in which the said solidified membrane preferably swells, making the polymer chains more accessible for reaction with said crosslinker. Wherein said crosslinker is a reactive polyfunctional monomer suitable for crosslinking said membrane polymer.

Alternatively a crosslinked support membrane can be obtained using so called "simultaneous crosslinking", wherein in step (d) said still liquid polymer film is immersed in said solution comprising a non-solvent for said membrane forming polymer in which a membrane polymer crosslinker is dissolved. Wherein said crosslinker is a reactive polyfunctional monomer suitable for crosslinking said membrane polymer.

So in a second embodiment the present invention provides a method for the preparation of an asymmetric membrane, wherein said membrane comprises a top-layer having a lower porosity as compared to that of the underlying membrane structure and wherein said method comprises following steps:

a. preparing a gas phase comprising a vaporised first reactive monomer;

b. casting a solution of a first polymer wherein said first polymer can be crosslinked by said first reactive monomer;

c. contacting the upper layer of said cast first polymer solution with the first reactive monomer in order to form said top-layer, wherein said first reactive monomer is contained in the gas phase of step (a) and wherein upon contact between said first reactive monomer and the upper layer of said cast first polymer solution, said first reactive monomer reacts with the first polymer thus crosslinking said first polymer within said upper layer of the cast polymer solution;

d. inducing phase inversion of the cast first polymer solution in order to obtain an asymmetric solidified membrane comprising a less porous top-layer. Preferably, said phase inversion is induced by immersing said cast polymer solution obtained in step (c) in a non-solvent for said first polymer in order to obtain an asymmetric membrane comprising a less porous top-layer. Typically, said non-solvent preserves the crosslinking bounds in said top layer of the membrane as formed in step (c). Alternatively, said phase inversion is induced by contacting the cast polymer solution with a vapour phase comprising a non-solvent for the polymer or by thermal precipitation.

Optionally the method according to the second embodiment of the present invention comprises additional steps for further crosslinking of the membrane over its entire thickness, referred to as bulk crosslinking. Such bulk crosslinking may involve so called "sequential crosslinking" wherein the said solidified asymmetric membrane is immersed in a solvent exchange medium comprising a solvent in which a crosslinker is solubilized and in which the said assymetric membrane preferably swells, making all polymer chains accessible for said crosslinker. Wherein said crosslinker is a reactive polyfunctional monomer suitable for crosslinking said membrane polymer. Alternatively, said bulk cross-linking involves the use of "simultaneous crosslinking", wherein in step (d) said still liquid polymer film is immersed in said solution comprising a non-solvent for said membrane forming polymer in which a membrane polymer crosslinker is dissolved. Wherein said crosslinker is a reactive polyfunctional monomer suitable for crosslinking said membrane polymer.

Typically, an asymmetric membrane obtained according to this second embodiment of the invention is further treated in different rinsing and/or conditioning baths. Optionally, the resulting membrane is treated with an activating solvent.

In a third embodiment of the present invention, an interfacial polymerisation approach is used whereby a top-layer is formed on the said cast and still liquid polymer solution film as a result of the reaction between a first reactive monomer and a second reactive monomer contained in the said still liquid polymer solution film, wherein the upper layer of said cast film is contacted with a solution comprising said first reactive monomer and a solvent, preferably an organic solvent. Typically, said solvent of said first monomer solution is not a non-solvent for the solubilized polymer in said cast polymer film solution. The said coated polymer film is subsequently immersed in a coagulation bath, comprising a non-solvent for the membrane forming polymer. More specifically, this method of the present invention for the preparation of asymmetric membranes using interfacial polymerisation, comprises the following steps:

a. Preparing a polymer dope solution by dissolving a membrane forming polymer and a second reactive monomer in an appropriate organic solvent; preferably, the said second reactive monomer is unreactive towards the said membrane forming polymer in the polymer dope solution;

b. Casting the said polymer dope solution into a still liquid polymer solution film;

c. Coating the said liquid polymer solution film with a solution containing a first reactive monomer dissolved in a solvent, preferably an organic solvent, to obtain a reaction between said first and second monomer at the interface of the said still liquid polymer film, resulting in a crosslinked and densified top-layer upon the said still liquid polymer film;

d. Immersing the said still liquid polymer film with crosslinked top-layer into a coagulation bath, containing non-solvent for the polymer, to induce complete solidification of the said still liquid polymer film, resulting in a solidified membrane with crosslinked top-layer;

e. (optional) If a crosslinked support membrane is desired via "sequential crosslinking": immersing the said solidified membrane with crosslinked top-layer in a solvent exchange medium comprising a solvent in which a crosslinker is solubilized and in which the said solidified membrane preferably swells, making the polymer chains more accessible for reaction with said crosslinker. Wherein said crosslinker is a reactive polyfunctional monomer suitable for crosslinking said membrane polymer.

Alternatively a crosslinked support membrane can be obtained using so called "simultaneous crosslinking", wherein in step (d) said still liquid polymer film is immersed in said solution comprising a non-solvent for said membrane forming polymer in which a membrane polymer crosslinker is dissolved. Wherein said cross-linker is a reactive polyfunctional monomer suitable for crosslinking said membrane polymer.

So in a third embodiment the present invention provides a method for the preparation of an asymmetric membrane, wherein said membrane comprises a top-layer having a lower porosity as compared to that of the underlying membrane structure and wherein said method comprises following steps:

a. preparing a liquid phase comprising a solution of a first reactive monomer in a solvent, preferably an organic solvent; typically said solvent is not a non-solvent for the solubilized polymer of step b;

b. casting a solution of a first polymer wherein said first polymer solution comprises a second reactive monomer that can react with said first reactive monomer in order to form a second polymer material. Typically, said second monomer does not react with said first polymer. Optionally said first polymer can also be crosslinked by said first reactive monomer;

c. contacting the upper layer of said cast first polymer solution with the first reactive monomer in order to form said top-layer, wherein said first reactive monomer is contained in said liquid phase of step (a) and wherein upon contact between said first reactive monomer and the upper layer of said cast first polymer solution, said first reactive monomer reacts with said second reactive monomer thus forming a second polymer within said upper layer of the cast polymer solution. Optionally part of said first monomer can also reacts with said first polymer resulting in the crosslinking of the first polymer. Preferably said liquid phase comprising said first reactive monomer is brought into contact with the upper layer of said cast polymer solution by atomizing said liquid phase of step (a) on said upper layer of the cast film;

d. inducing phase inversion of the cast first polymer solution in order to obtain an asymmetric solidified membrane comprising a less porous top-layer. Preferably, said phase inversion is induced by immersing said cast polymer solution obtained in step (c) in a non-solvent for said first polymer in order to obtain an asymmetric membrane comprising a less porous top-layer; typically said non-solvent is also a non-solvent for the second polymer formed in said upper layer in step (c). Alternatively, said phase inversion is induced by contacting the cast polymer solution with a vapour phase comprising a non-solvent for the polymer or by thermal precipitation.

Optionally the method according to the third embodiment of the present invention comprises additional steps for further crosslinking of the membrane over its entire thickness, referred to as bulk crosslinking. Such bulk crosslinking may involve so called "sequential crosslinking" wherein the said solidified asymmetric membrane is immersed in a solvent exchange medium comprising a solvent in which a crosslinker is solubilized and in which the said asymmetric membrane preferably swells, making all polymer chains accessible for said crosslinker. Wherein said crosslinker is a reactive polyfunctional monomer suitable for crosslinking said membrane polymer. Alternatively, said bulk cross-linking involves the use of "simultaneous cross-linking", wherein in step (d) said still liquid polymer film is immersed in said solution comprising a non-solvent for said membrane forming polymer in which a membrane polymer crosslinker is dissolved. Wherein said crosslinker is a reactive polyfunctional monomer suitable for crosslinking said membrane polymer.

Typically, an asymmetric membrane obtained according to this third embodiment of the invention is further treated in different rinsing and/or conditioning baths. Optionally, the resulting membrane is treated with an activating solvent.

In a fourth embodiment of the present invention, an interfacial polymerisation approach is used whereby a top-layer is formed on the said cast and still liquid polymer solution film as a result of the reaction between a first reactive monomer and a second reactive monomer contained in the said still liquid polymer solution film, wherein the upper layer of said cast film is contacted with a first reactive monomer within a vapour phase. The said still liquid polymer film with crosslinked toplayer is subsequently immersed in a coagulation bath, comprising a non-solvent for the membrane forming polymer. More specifically, this method of the present invention for the preparation of asymmetric membranes using interfacial polymerisation, comprises the following steps:
  a. Preparing a polymer dope solution by dissolving a membrane forming polymer and a second reactive monomer in the appropriate organic solvent. The said second reactive monomer is unreactive towards the said membrane forming polymer in the polymer dope solution.
  b. Casting the said polymer dope solution into a still liquid polymer film.
  c. Introducing the said still liquid polymer film to a reactive vapour phase comprising a first reactive monomer to obtain a reaction between said first and second monomer at the interface of the said still liquid polymer film, resulting in a crosslinked and densified top-layer upon the said still liquid polymer film.
  d. Immersing the said still liquid polymer film with crosslinked top-layer into a coagulation bath, containing non-solvent for the polymer, to induce solidification, preferably complete solidification, of the said still liquid polymer film, resulting in a solidified membrane with crosslinked top-layer.
  e. (optional) If a crosslinked support membrane is desired via "sequential crosslinking": immersing the said solidified membrane with crosslinked top-layer in a solvent exchange medium comprising a solvent in which a crosslinker is solubilized and in which the said solidified membrane preferably swells, making the polymer chains more accessible for reaction with said crosslinker. Wherein said crosslinker is a reactive polyfunctional monomer suitable for crosslinking said membrane polymer.

Alternatively a crosslinked support membrane can be obtained using so called "simultaneous crosslinking", wherein in step (d) said still liquid polymer film is immersed in said solution comprising a non-solvent for said membrane forming polymer in which a membrane polymer crosslinker is dissolved. Wherein said cross-linker is a reactive polyfunctional monomer suitable for crosslinking said membrane polymer.

So in a fourth embodiment the present invention provides a method for the preparation of an asymmetric membrane, wherein said membrane comprises a top-layer having a lower porosity as compared to that of the underlying membrane structure and wherein said method comprises following steps:
  a. preparing a gas phase comprising a vaporised first reactive monomer;
  b. casting a solution of a first polymer wherein said first polymer solution comprises a second reactive monomer that can react with said first reactive monomer in order to form a second polymer material. Typically, said second monomer does not react with said first polymer. Optionally said first polymer can also be crosslinked by said first reactive monomer;
  c. contacting the upper layer of said cast first polymer solution with the first reactive monomer in order to form said top-layer, wherein said first reactive monomer is contained in the gas phase of step (a) and wherein upon contact between said first reactive monomer and the upper layer of said cast first polymer solution, said first reactive monomer reacts with said second reactive monomer thus forming a second polymer within said upper layer of the cast polymer solution. Optionally part of said first monomer can also reacts with said first polymer resulting in the cross-linking of the first polymer.
  d. inducing phase inversion of the cast first polymer solution in order to obtain an asymmetric solidified membrane comprising a less porous top-layer. Preferably, said phase inversion is induced by immersing said cast polymer solution obtained in step (c) in a non-solvent for said first polymer in order to obtain an asymmetric membrane comprising a less porous top-layer; typically said non-solvent is also a non-solvent for the second polymer formed in said upper layer in step (c). Alternatively, said phase inversion is induced by contacting the cast polymer solution with a vapour phase comprising a non-solvent for the polymer or by thermal precipitation.

Optionally the method according to the fourth embodiment of the present invention comprises additional steps for further crosslinking of the membrane over its entire thickness, referred to as bulk crosslinking. Such bulk crosslinking may involve so called "sequential crosslinking" wherein the said solidified asymmetric membrane is immersed in a solvent exchange medium comprising a solvent in which a crosslinker is solubilized and in which the said asymmetric membrane preferably swells, making all polymer chains accessible for said crosslinker. Wherein said crosslinker is a reactive polyfunctional monomer suitable for crosslinking said membrane polymer. Alternatively, said bulk cross-linking involves the use of "simultaneous crosslinking", wherein in step (d) said still liquid polymer film is immersed in said solution comprising a non-solvent for said membrane forming polymer in which a membrane polymer crosslinker is dissolved. Wherein said crosslinker is a reactive polyfunctional monomer suitable for crosslinking said membrane polymer.

Typically, an asymmetric membrane obtained according to this fourth embodiment of the invention is further treated in different rinsing and/or conditioning baths. Optionally, the resulting membrane is treated with an activating solvent.

In all embodiments of the present invention the inclusion of process steps for bulk crosslinking of the asymmetric membrane results in a more solvent resistant composite membrane. For use in aqueous applications such bulk crosslinking is not necessary.

Preferably any of the methods of the present invention, in particular of the third and fourth embodiment, are used for preparing polyamide (PA)/polyimide (PI) and PA/polysulfone (PSf) asymmetric membranes (with a PA top-layer on an optionally bulk crosslinked PI or PSf membrane support).

Furthermore, the methods of the present invention are used for obtaining asymmetric membranes with a broad variation in toplayer composition by use of click-chemistry reactions upon a PI or PSf membrane.

Liquid Polymer Film Preparation

In the context of the present invention, the liquid polymer film preparation typically involves the following steps: (a) preparing a polymer dope solution comprising (i) a membrane forming polymer with reactive functional groups in or on the main polymer chain or (ii) a membrane forming polymer and a reactive monomer (second reactive monomer), which is unreactive towards the said membrane forming polymer; (b) casting a film of said dope solution.

Suitable membrane forming polymer materials including PI, PSf, PES, polybenzimidazole, polyacrylonitrile, polyvinylidene fluoride (PVDF), poly(vinyl alcohol) (PVA), polydimethylsiloxane (PDMS), poly(vinyl chloride) (PVC), Teflon, polypropylene, and polyether ether ketone (PEEK), or sulfonated polyether ether ketone (SPEEK). The polymer used to form the polymer liquid film includes but is not limited to PI and PSf polymer sources.

The polymer dope solution may be prepared by dissolving the polymer making up the membrane in one or a mixture of organic solvents, including the following water miscible solvents: N-methylpyrrolidone (NMP), tetrahydrofuran (THF), N,N-dimethylformamide (DMF), N,N-dimethylacetamide (DMAc), dimethylsulfoxide (DMSO), 1,4-dioxane, gamme-butyrolactone, water, alcohols, ketones and formamide. The weight percent of the polymer in solution may range from 5% to 30% in the broadest sense, although a 12% to 28% range is preferable and a 12% to 24% range or 18% to 22% is even more preferred.

A still liquid polymer film for use in the method according to the present invention can be prepared as follows: a polymer dope solution is cast onto a suitable substrate, from which it then may be removed. Casting of the membrane may be performed by any number of casting procedures cited in the literature, for example U.S. Pat. Nos. 3,556,305; 3,567,810; 3,615,024; 4,029,582 and 4,188,354; GB-A-2, 000,720; Office of Saline Water R & D Progress Report No. 357, October 1967; Reverse Osmosis and Synthetic Membranes, Ed. Sourirajan; Murari et al, J. Membr. Sci. 16: 121-135 and 181-193, 1983.

Alternatively, a liquid polymer film for use in the method according to the present invention can be prepared as follows: once the desired polymer dope solution is prepared (i.e. polymers are dissolved in a suitable solvent system, and optionally organic or inorganic matrices are added into the dope solution so that the matrices are well dispersed) and, optionally, filtered by any of the known processes (e.g. pressure filtration through microporous filters, or by centrifugation), it is cast onto a suitable substrate, such as glass, metal, paper, plastic, etc., from which it may then be removed. Possibly, the desired polymer casting solution is cast onto a suitable porous substrate from which the membrane is not removed. Such porous substrate can take the form of an inert porous material which does not hinder the passage of permeate trough the membrane and does not react with the membrane material, the polymer dope solution, the aqueous coagulation medium, or the solvents which will permeate through the membrane during filtration.

Such porous substrates may be non-woven, or woven, including cellulosics (paper), polyethylene, polypropylene, nylon, vinyl chloride homo- and co-polymers, polystyrene, polyesters such as polyethylene terephthalate, polyvinylidene fluoride, polytetrafluoroethylene, PSf, PES, polyether ketones (PEEK), polyphenylene oxide, polyphenyline sulphide (PPS), ethylene-(R) ChloroTriFluoroEthylene (Halar® ECTFE), glass fibers, metal mesh, sintered metal, porous ceramic, sintered glass, porous carbon or carbon fibre material, graphite, inorganic membranes based on alumina and/or silica (possibly coated with zirconium and/or other oxides). The membrane may otherwise be formed as a hollow fiber or tubelet, not requiring a support for practical use; or the support may be of such shape, and the membrane is cast internally thereon.

Crosslinkers

For crosslinking PI it is preferred to use amino compounds selected out of the group consisting of cyclohexylamine; p-xylene diamine; 1,2-diaminoethane; 1,6-hexane diamine; 3-aminopropyhnethyldiethoxysilane; tris(2-aminoethyl)amine; triethylenetetramine; pentaethylenehexamine; polyethyleneimine; polyether diamines based predominantly on a polyethylene oxide backbone with a molecular weight of 50 to 20,000; trimethoxysilylpropyl-substituted polyethyleneamine having a molecular weight of 200 to 200,000; polyethyleneamine having a molecular weight of 1,000 to 200,000; aqueous ammonium hydroxide; and isobutyl amine.

For the crosslinking of PEEK, Hendrix et al. (2013) described a method using the phase-inversion process (Katrien Hendrix and others, 'Crosslinking of Modified Poly(ether Ether Ketone) Membranes for Use in Solvent Resistant Nanofiltration', *Journal of Membrane Science*, 447 (2013), 212-21.). PEEK is not soluble in common polar aprotic solvents what makes it impossible to prepare phase inversion membranes. However by introducing a well selected functional group, this problem can be overcome. Hendrix et al. (2013) used diphenolic acid to introduce a valeric acid group on PEEK. After activation of the carboxylic acid group, crosslinking was performed by adding diamines to the coagulation bath.

Often, PEEK is first converted to SPEEK via procedures disclosed in literature, e.g. U.S. 20,140,231,722 A1, to allow crosslinking. SPEEK can subsequently be crosslinked according to the procedure described in U.S. 20,140,231,722 A1. Herein sulphur sources include but are not limited to sulphuric acid; sulphur trioxide; sulfamic acid; chlorosulfonic acid; oleum and the like. As catalyst carbonyldiimidazole, such as 1,1'-tricarbonyldiimidazole; 1,1'-oxalyldiimidazole; 1,1-carbonyldiimidazole or mixtures thereof and the like can be used. The diamine used in the crosslinking reaction include but are not limited to 1,6-hexene diamine; 1,4-butane diamine; 4,4'-bis-(m-aminophenoxy)-biphenyl; 4,4'-bis-(m-aminophenoxy)-diphenyl sulphide; 4,4'-bis-(m-aminophenoxy)-diphenyl sulfone; 4,4'-diamino-azobenzene; 4,4'-diaminobiphenyl; 4,4'-diaminodiphenylsulfone; 4,4'-diamine-p-terphenyl; 1,3-bis-(gamma-aminopropyl)-tetramethyl-disiloxane; 4,4'-diaminediphenylmethane; 3,3'-diaminediphenylmethane; 1,3-diaminebenzene; 4,4'-diamine-2,2',3,3'5,5',6,6'-octafluoro-biphenyl; 4,4'-diamino-2,2',3,3', 5,5',6,6'-octafluorodiphenyl ether; bis[4-(3-aminophenoxy)-phenyl]sulphide; bis[4-(3-aminophenoxy)phenyl]sulfone;

bis[4-(3-aminophenoxy)phenyl]ketone; 4,4'-bis(3-aminophenoxy)biphenyl; 2,2-bis[4-(3-aminophenoxy)phenyl]propane; 2,2-bis[4-(3-aminophenoxy)phenyl]-1,1,1,3,3,3-hexafluoropropane; 4,4'-diaminodiphenyl sulphide; 4,4'diaminediphenyl ether; 4,4'-diaminodiphenyl sulfone; 4,4'-diaminodiphenylmethane; 1,1-di(p-aminophenyl)ethane; 2,2-di(p-aminophenyl)propane; 2,2-di(p-aminophenyl)-1,1,1,3,3,3-hexafluoropropane, and the like, and mixtures thereof.

Crosslinking of polybenzimidazole can be performed according to the procedures described in U.S. Pat. Nos. 4,666,996 A; 6,997,971 B1; 6,946,015 B2 and 6,986,844 B2.

PVA can be crosslinked via different approaches as described by Brian Bolto and others, 'Crosslinked Poly(vinyl Alcohol) Membranes', *Progress in Polymer Science (Oxford)*, 34 (2009), 969-81. Among the possibilities for crosslinking are freeze-thaw inducement of crystallisation; heat treatment; acid-catalysed dehydratation; irradiation; radical production; formaldehyde, glutaraldehyde and other aldehydes reactions; di-, tri- and polycarboxylic acids, anhydrides or acid chlorides reactions; alkoxysilane reactions and other chemical crosslinking agents. Most frequently glutaraldehyde in the presence of an appropriate catalyst, such as hydrochloric acid, is used for the crosslinking of PVA membranes. Other crosslinkers include but are not limited to formaldehyde; glyoxal; terphthaldehyde; acrolein; methacrolein; urea formaldehyde/$H_2SO_4$; citric acid; maleic acid and anhydride; maleic anhydride copolymers with vinyl methyl ether; maleic acid; malonic acid; fumaric acid; poly(acrylic acid); trimesic acid; trimesoyl chloride; toluene diisocyanate; glycidyl acrylate; divinyl sulphone; boric acid; 1,2-dibromoethane; tetraethoxysilane; γ-glycidoxyprpyltrimethoxysilane; γ-mercaptopropyltrimethoxysilane and the like.

Crosslinking of PVDF can be performed via high energy radiation, or via chemical reaction with peroxide with or without coagents, dithiols in combination with amines, aromatic polyhydroxy compounds, diamines and their derivatives and thiol-ene systems as described by A. Taguet, B. Ameduri and B. Boutevin, 'Crosslinking of Vinylidene Fluoride-Containing Fluoropolymers', *Advances in Polymer Science*, 184 (2005), 127-211.

PSf, PES, polyacrylonitrile, Teflon and polypropylene are often crosslinked via radiation.

Reactive Monomers

Said first and second monomers in the third and fourth embodiments of the present invention are called "reactive monomers". The term "reactive monomer" encompasses monomers with two or more functional groups capable of forming a polymer with a selected second reactive monomer. Depending on the size of the compound, more than two functional groups may be accommodated to promote crosslinking. For the purpose of this invention, "reactive monomer" encompasses any compound with at least two functional groups which react in a manner analogous to classic polymerisation reactions described for IFP, including all possible monomers described for "click reactions" defined in both the broad and narrow sense of the term. These "click reactions" include but are not limited to reactions between amine and acid chloride; 4-substituted-1,2,4-triazoline 3,5-dione (TAD) and alkene components; thiol and alkene components; maleimide and amine or thiol components; epoxide and amine, thiol or alcohol components and the like. Some examples of the first and second reactive monomer are represented in Table 1.

TABLE 1

Examples of the first and possible corresponding second reactive monomers. Note, the first and second reactive monomer can be switched.

| First reactive monomer | Second reactive monomer |
| --- | --- |
| Amine | Acid chloride |
| Hexanediamine | Trimesoylchloride |
| Meta-phenylenediamine | Isophtaloylchloride |
| Para-xylenediamine | Terephtaloylchloride |
| Ethylenediamine | Suberoylchloride |
| Diethylenetriamine | Sebacoylchloride |
| N,N'-dimethylethylenediamine | Epoxide |
| Polyethyleneimine | Bisphenol-A-diglycidyl-ether |
| And other polyamines described earlier | Neopentylglycol diglycidylether |
| | Trimethylolprpoane triglycidylether |
| | 1,4-butanediol diglycidylether |
| | 3-triglycidyl-p-aminophenol |
| | Tetraglycidyl-4,4'-diaminodiphenylmethane |
| Thiol | Epoxide |
| Triglycodimercaptane | Bisphenol-A-diglycidyl-ether |
| 1,3,4-Thiadiazole-2,5-dithiol | Neopentylglycol diglycidylether |
| Pentaerythritol tetrakis (3-mercaptopropionate) | Trimethylolprpoane triglycidylether |
| 1,3-Propaandithiol | 1,4-butanediol diglycidylether |
| 1,4-Butaandithiol | 3-triglycidyl-p-aminophenol |
| 1,5-Pentaandithiol | Tetraglycidyl-4,4'-diaminodiphenylmethane |
| 1,2,3-Propaantrithiol | |
| 1,1,3,3-Propaantetrathiol | Alkene |
| | Propene |
| | Methyl vinyl ether |
| | Methyl allyl ether |
| | Norborene |
| | Acrylonitryle |
| | Methyl acrylate |
| | Butadiene |
| | Methyl(vinyl)silanediamine |
| | Methyl crotonate |
| | Dimethyl fumarate |
| | Styrene |
| | Maleïmide |

Phase-Inversion Approach

The term "phase-inversion" refers to the controlled transformation of a thermodynamically stable polymer solution to a solid phase (membrane) by liquid-liquid demixing. This can be carried out by immersion of the cast polymer solution in a coagulation bath comprising a non-solvent for the polymer, possibly following a (short) solvent evaporation step during which a certain densification of the upper layer can take place already or not (immersion precipitation); or by contacting the cast polymer solution with a vapour phase comprising a non-solvent for the polymer; or by thermal precipitation.

In the first and second embodiment of the present invention, a phase-inversion approach is followed whereby the crosslinking reaction at the surface of the said still liquid polymer film occurs between the membrane polymer, containing reactive functional groups and/or reactive segments in the polymer main chain, and a reactive crosslinker (first monomer) introduced via a liquid phase or contact with a vapour phase, respectively, to the said still liquid polymer film. The liquid phase contains a suitable crosslinker for the membrane polymer dissolved in an organic solvent which can be the same, miscible or immiscible with the solvent used during preparation of the polymer dope solution. Variations in length and sequence of liquid phase contact and evaporation can be introduced. The reactive vapour phase contains a suitable crosslinker for the membrane polymer and is introduced via a confined space at equilibrium with a vaporizing liquid phase of the said suitable crosslinker.

Variations in length and sequence of vapour phase contact and evaporation can be introduced.

After formation of the said still liquid polymer film with crosslinked toplayer via the phase-inversion approach, the said film is immersed in a coagulation bath comprising a non-solvent for the membrane forming polymer and the said formed crosslinked toplayer. The final result of the first and second new approach disclosed in this patent is a completely solidified asymmetric membrane.

Interfacial Polymerisation Approach

In the IFP technique, two monomers react to form a crosslinked toplayer, here reaction occurs between a first reactive monomer introduced via a liquid or vapour phase and a second reactive monomer present in the cast still liquid polymer film. In the third and fourth embodiment of the present invention, such an IFP approach is used whereby two monomers react at the surface of the said still liquid polymer film to form a crosslinked toplayer. Hereby, the polymer dope solution contains the membrane forming polymer and a second reactive monomer which is unreactive towards the said membrane forming polymer. The said polymer dope solution is cast and a first reactive monomer is introduced via a liquid or vapour phase contact, respectively, to the said still liquid polymer film. The liquid phase contains a suitable first reactive monomer, dissolved in an organic solvent or mixture thereof, for reaction with the second reactive monomer present in the said still liquid polymer film. Said organic solvent can be the same, miscible or immiscible with the solvent used during preparation of the polymer dope solution. Variations in length and sequence of liquid phase contact and evaporation can be introduced. The reactive vapour phase contains a suitable first reactive monomer for reaction with the said second reactive monomer present in the said still polymer film. Said vapour phase is introduced via a confined space at equilibrium with a vaporizing liquid phase of the said suitable second reactive monomer. Variations in length and sequence of vapour phase contact and evaporation can be introduced.

After formation of the said still liquid polymer film with crosslinked toplayer via the IFP approach, the said film is immersed in a coagulation bath comprising a non-solvent for the membrane forming polymer and the said formed crosslinked toplayer. The final result of the third and fourth new approach disclosed in this patent is a completely solidified asymmetric composite membrane.

Crosslinking of the Support Membrane

All new embodiments of the present invention a further crosslinking of the support layer, resulting in solvent resistant membranes and membranes with higher stability towards plasticisation effects observed in gas separations.

The "sequential crosslinking" as referred to herein comprises of first preparing a completely solidified membrane by one of the four new approaches disclosed in this patent and subsequently immersing the said solidified membrane in a solvent exchange medium comprising a solvent in which the crosslinker is soluble and in which said solidified membrane preferably swells, making all polymer chains accessible for said crosslinker. Afterwards the said swollen solidified membrane is contacted to a crosslinking medium comprising the same said solvent and therein dissolved crosslinker. To reduce solvent consumption the crosslinker can also be dissolved in the solvent exchange medium, eliminating the need of a second crosslinking medium.

The "simultaneous crosslinking" as referred to herein comprises of adding the support layer crosslinker to the coagulation bath wherein the said still liquid polymer film with crosslinked toplayer is solidified (Sanne Hermans and others, 'Efficient Synthesis of Interfacially Polymerized Membranes for Solvent Resistant Nanofiltration', *Journal of Membrane Science*, 476 (2014), 356-63.). Possibly, extra additives can be introduced to the said coagulation bath to further increase swelling and/or accessibility of the polymer chains.

Treatment of the Resulting Asymmetric Membranes with an Activating Solvent

In the method according to the present invention, the post-treatment step preferably includes treating the resulting asymmetric membranes prior to use for (nano)filtration with an activating solvent, including, but not limited to, polar aprotic solvents. In particular, activating solvents include DMAc, NMP, DMF and DMSO. The activating solvent as referred to herein is a liquid that enhances the asymmetric membrane flux after treatment. The choice of activating solvent depends on the top layer and membrane support stability. Contacting may be effected through any practical means, including passing the asymmetric membrane through a bath of the activating solvent, or filtering the activating solvent through the asymmetric membrane (Maria Fernanda Jimenez Solomon, Yogesh Bhole and Andrew Guy Livingston, 'High Flux Membranes for Organic Solvent Nanofiltration (OSN)—Interfacial Polymerization with Solvent Activation', *Journal of Membrane Science*, 423-424 (2012), 371-82.).

EXAMPLES

Abbreviations Used

PSf (polysulfone); PI (polyimide); NMP (N-methyl-2-pyrollidone); THF (tetrahydrofuran); MPD (m-phenylene diamine); XDA (p-xylenediamine); TMC (trimesoylchloride); PA (polyamide); RB (Rose Bengal); mQ (milliQ); HDA: hexane diamine The filtration performance (evaluated by the permeance and rejection properties of the membranes) is assessed by "dead-end" NF with the following feed solutions: 35 µM RB in mQ water.

Example 1

A polymer dope solution was prepared by dissolving 20 wt % PI (Lenzing P84, Evonik) in an NMP/THF 2/1 (Acros) solvent mixture until complete dissolution. The viscous polymer solution was allowed to stand for several hours to remove air bubbles. The dope solution was then cast onto a glass plate with a casting speed of 0.032 m/s. Immediately after casting all the wet films were spray-coated for 30 sec. Half of the cast films was spray-coated with an NMP/THF 3/1 organic solution and represent the Blanco membranes. The other half of the cast membranes was spray-coated with an organic solution of 2 wt % XDA in NMP/THF 3/1 and represent the 2 wt % XDA crosslinked membranes. The applied airbrush pressure was 0.5 bar. After spray-coating, all films were let to evaporate and/or react for 1 min prior to immersing the films in a coagulation bath comprising demineralized water for 5 min. In comparison, a reference membrane of 20 wt % PI (Lenzing P84, Evonik) was cast and let to evaporate for 1 min prior to immersion precipitation. The resulting asymmetric membranes were stored in water until use.

The filtration characteristics after filtration with 35 µM RB in mQ water are summarized in Table 2.

TABLE 2

Results Example 1

| Nr. | Membrane | Pressure [bar] | Permeance [L/m²hbar] | Retention [%] |
|---|---|---|---|---|
| 1 | P84 reference | 15 | 0.99 | 99.77 |
| 2 | Blanco | 40 | 0.08 | 91.90 |
| 3 | 2 wt % XDA | 30 | 0.25 | 97.45 |

Analysing the results in Table 2, a clear difference in permeance is observable were membrane 1 exhibits the highest permeance. Membrane 2 and 3 have much lower permeances, but they still show a difference. The lower permeance of membrane 2 compared with membrane 3 can be explained by the crosslinking action of XDA, fixating the polymer chains before immersion precipitation, and thus reducing the densification effect playing in membrane 3. Analysing the RB retentions, spray-coated membranes (2 and 3) have lower retentions due to less densification effects.

Example 2

Asymmetric membranes were prepared exactly as described in example 1, with the only difference that the airbrush pressure was varied between 0.5-1.5 bar. The resulting asymmetric membranes were stored in water until use.

The filtration characteristics after filtration with 35 µM RB in mQ water are summarized in Table 3.

TABLE 3

Results Example 2

| Nr. | Membrane | Pressure [bar] | Permeance [L/m²hbar] | Retention [%] |
|---|---|---|---|---|
| 1 | Blanco 0.5 bar | 40 | 0.09 | 91.90 |
| 2 | Blanco 1.0 bar | 40 | 0.08 | 96.51 |
| 3 | Blanco 1.5 bar | 40 | 0.14 | 99.03 |
| 4 | 2 wt % XDA 0.5 bar | 30 | 0.25 | 97.45 |
| 5 | 2 wt % XDA 1.0 bar | 30 | 0.21 | 92.72 |
| 6 | 2 wt % XDA 1.5 bar | 30 | 0.21 | 87.73 |

From membrane 1-3 it is clear that increasing the spray-pressure leads to an increased RB retention. However, for membrane 4-6 the opposite trend can be observed. A possible explanation for this observation is that in absence of an XDA crosslinker an increased pressure will result in a membrane densification. When crosslinker is however present, PI will be crosslinked very fast resulting in a fixed membrane formation. Further densification by air pressure will thus be limited with decreasing retentions as a result. In general, permeances are very similar.

Example 3

Asymmetric membranes were prepared exactly as described in example 1, with the only difference that the crosslinker concentration was varied between 2 wt % XDA and 5 wt % XDA. The resulting asymmetric membranes were stored in water until use.

The filtration characteristics after filtration with 35 µM RB in mQ water are summarized in Table 4.

TABLE 4

Results of Example 3

| Nr. | Membrane | Pressure [bar] | Permeance [L/m²hbar] | Retention [%] |
|---|---|---|---|---|
| 1 | Blanco | 40 | 0.05 | 99.34 |
| 2 | 2 wt % XDA | 40 | 0.08 | 99.50 |
| 3 | 5 wt % XDA | 40 | 0.07 | 99.58 |

From Table 4 it can be observed that increasing the XDA crosslinker concentration has little effect on the RB retentions of the membrane. As explained before, the presence of crosslinker will fixate the polymer before solidification which can explain the small difference in RB retention compared to the Blanco membrane.

Example 4

Asymmetric membranes were prepared exactly as described in example 1, with the only difference that the reaction time after spray-coating was varied ranging from 1-10 min. The resulting asymmetric membranes were stored in water until use.

The filtration characteristics after filtration with 35 µM RB in mQ water are summarized in Table 5.

TABLE 5

Results of Example 4

| Nr. | Membrane | Pressure [bar] | Permeance [L/m²hbar] | Retention [%] |
|---|---|---|---|---|
| 1 | Blanco 1 min | 40 | 0.12 | 98.01 |
| 2 | Blanco 2 min | 40 | 0.04 | 94.36 |
| 3 | Blanco 5 min | 40 | 0.04 | 98.53 |
| 4 | Blanco 10 min | 40 | 0.05 | 99.34 |
| 5 | 2 wt % XDA 1 min | 40 | 0.37 | 98.22 |
| 6 | 2 wt % XDA 2 min | 40 | 0.08 | 99.32 |
| 7 | 2 wt % XDA 5 min | 40 | 0.10 | 98.68 |
| 8 | 2 wt % XDA 10 min | 40 | 0.08 | 99.50 |

From Table 5 it can be observed that increasing the evaporation/reaction time has only little influence on the performance of the membranes. All membranes have similar retentions, however there is a small increase in permeance observable for lower evaporation/reaction times. Also there is little difference between the Blanco (1-4) and XDA (5-8) membranes. This can be explained by the same reasons as discussed in previous examples.

Example 5

Asymmetric membranes were prepared exactly as described in example 1, with the only difference that the spray-coating time was varied ranging from 30 sec-120 sec. The resulting asymmetric membranes were stored in water until use.

The filtration characteristics after filtration with 35 µM RB in mQ water are summarized in Table 6.

TABLE 6

Results of Example 5

| Nr. | Membrane | Pressure [bar] | Permeance [L/m²hbar] | Retention [%] |
|---|---|---|---|---|
| 1 | Blanco 30 sec | 40 | 0.08 | 99.01 |
| 2 | Blanco 60 sec | 40 | 0.05 | 99.43 |
| 3 | Blanco 90 sec | 40 | 0.04 | 98.95 |

TABLE 6-continued

Results of Example 5

| Nr. | Membrane | Pressure [bar] | Permeance [L/m²hbar] | Retention [%] |
|---|---|---|---|---|
| 4 | Blanco 120 sec | 40 | 0.05 | 99.69 |
| 5 | 2 wt % XDA 30 sec | 40 | 0.90 | 99.30 |
| 6 | 2 wt % XDA 60 sec | 40 | 0.48 | 99.32 |
| 7 | 2 wt % XDA 90 sec | 40 | 0.07 | 98.12 |
| 8 | 2 wt % XDA 120 sec | 40 | 0.10 | 99.38 |

As can be observed from Table 6, an increase in spray time has only little effect on RB retentions of both Blanco and XDA membranes. Analysing the permeance results, a longer spray-time results most often in a lower permeance. This might be explained by possibly more crosslinking or densification of the membranes. Furthermore, also here little difference is observable between Blanco and XDA membranes for the same reasons as explained above.

Example 6

A polymer dope solution was prepared by dissolving 18 wt % PSf (Udel® P-1700, Solvay) and 2 wt % MPD (Acros) in NMP (Acros) until complete dissolution. The viscous polymer solution was allowed to stand for several hours to remove air bubbles. The dope solution was then cast onto a glass plate with a casting speed of 0.032 m/s. Immediately after casting all the wet films were spray-coated for 30 sec. Half of the cast films was spray-coated with an hexane organic solution and represent the Blanco membranes. The other half of the cast membranes was spray-coated with an organic solution of 0.1 wt % TMC (Acros) in hexane and represent the membranes with a PA toplayer formed via the IFP approach. After spray-coating, all films were let to evaporate and/or react for 1 min prior to immersing the films in a coagulation bath comprising demineralized water for 5 min. The resulting asymmetric membranes were stored in water until use.

TABLE 7

Possible assignments for IR spectra

| Wavenumber [cm⁻¹] | | |
|---|---|---|
| PSf | PA toplayer | Spectra assignments |
| 3600-3200 | | H-bonded O—H stretch |
| | 3460-3400 | N—H stretch |
| | 1660 | C=O stretch amide I |
| | 1610 | Aromatic amide (N—H bend or C=C ring stretch) |
| | 1540 | N—H bend and CN stretch amide II |
| 1323 | | C—SO₂—C asymmetric stretch |
| 1295 | | S=O stretch |
| 1240 | | C—O—C symmetric stretch |
| 1157 | | C—SO₂—C symmetric stretch |

As can be seen from FIG. 3, there is a clear formation of a PA toplayer.

Example 7

A polymer dope solution was prepared by dissolving 20 wt % PI (Lenzing P84, Evonik) and 0.1 wt % TMC (Acros) in NMP/THF 2/1 (Acros) until complete dissolution. The viscous polymer solution was allowed to stand for several hours to remove air bubbles. The dope solution was then cast onto a glass plate with a casting speed of 0.032 m/s. Immediately after casting all the wet films were spray-coated for 30 sec. Half of the cast films was spray-coated with an NMP/THF 3/1 organic solution and represent the Blanco membranes. The other half of the cast membranes was spray-coated with an organic solution of 2 wt % MPD in NMP/THF 3/1 and represent the membranes with a PA toplayer formed via the IFP approach. After spray-coating, all films were let to evaporate and/or react for 10 min prior to immersing the films in a coagulation bath comprising demineralized water for 5 min. The resulting asymmetric membranes were stored in water until use.

The filtration characteristics after filtration with 35 μM RB in mQ water are summarized in Table 8.

TABLE 8

Results of Example 7

| Nr. | Membrane | Pressure [bar] | Permeance [L/m²hbar] | Retention [%] |
|---|---|---|---|---|
| 1 | PI Blanco | 40 | 0.05 | 99.57 |
| 2 | PI + PA toplayer | 40 | 0.08 | 97.73 |

The results in Table 8 indicate that similar effects play a role in de IFP approach compared to the phase-inversion approach. Membrane 1 has a lower permeance and higher retention due to a densification effect on the toplayer, whereas membrane 2 was subjected to direct fixation of the PA toplayer upon formation.

Example 8

The 2-step formation of the membrane structure is often reflected in cross-sectional SEM-pictures as a top-zone near the membrane surface with different pore structure. This is a consequence of the crosslinking reaction that had already taken place before the bulk part of the membrane was solidified.

Example 9

A polymer dope solution was prepared by dissolving 18 wt % PI (Lenzing P84, Evonik) in NMP (Acros) until complete dissolution. The viscous polymer solution was allowed to stand for several hours to remove air bubbles. The dope solution was then cast onto a glass plate with a casting speed of 0.032 m/s. Immediately after casting all the wet films were placed in a confined space equipped with a heating element and a ventilator for even distribution of the vapour over the volume. Half of the cast films was laid in the confined space for a certain amount of time, ranging from 1 min-90 min, without the introduction of amine vapour. The other half of the cast films was contacted with an HDA (Aldrich) vapour in the confined space during a certain amount of time, ranging from 1 min-90 min. After vapour phase contact all films were immersed in a coagulation bath comprising demineralized water for 5 min. The resulting asymmetric membranes were stored in water until use.

The filtration characteristics after filtration with 35 μM RB in mQ water are summarized in Table 9.

TABLE 9

Results of Example 9

| Nr. | Membrane | Pressure [bar] | Permeance [L/m$^2$hbar] | Retention [%] |
|---|---|---|---|---|
| 1 | Blanco 1 min | 2 | 49.08 | 14.49 |
| 2 | Blanco 2.5 min | 2 | 44.03 | 15.76 |
| 3 | Blanco 5 min | 2 | 46.75 | 14.12 |
| 4 | Blanco 10 min | 2 | 51.73 | 14.94 |
| 5 | Blanco 15 min | 2 | 55.15 | 27.82 |
| 6 | Blanco 20 min | 2 | 45.36 | 25.28 |
| 7 | Blanco 30 min | 2 | 25.18 | 26.62 |
| 8 | Blanco 90 min | 40 | 0.45 | 68.47 |
| 9 | HDA 1 min | 40 | 1.77 | 37.08 |
| 10 | HDA 2.5 min | 40 | 1.85 | 33.63 |
| 11 | HDA 5 min | 40 | 1.74 | 37.71 |
| 12 | HDA 10 min | 40 | 0.64 | 88.84 |
| 13 | HDA 15 min | 40 | 0.66 | 92.14 |
| 14 | HDA 20 min | 40 | 0.51 | 98.98 |
| 15 | HDA 30 min | 40 | 0.38 | 99.40 |
| 16 | HDA 90 min | 40 | 1.24 | 42.43 |

The results in Table 9 indicate that the presence of an amine during vapour contact (9-16) has a profound effect on the performance of the membrane. The presence of the HDA crosslinker improves RB retentions but reduces the permeance.

Example 10

The membranes form example 9 were tested for chemical composition using ATR-FTIR.

TABLE 10

Possible assignments for IR spectra

| Wavenumber [cm$^{-1}$] | | |
|---|---|---|
| Blanco | HAD crosslinked | Spectra assignments |
|  | 3460-3400 | N—H stretch |
| 1780 | 1780 | C=O stretch imide |
| 1713 | 1713 | C=O stretch imide |
|  | 1648 | C=O stretch amide I |
|  | 1540 | N—H bend and CN stretch amide II |
| 1380 | 1380 | C—N stretch imide |

As can be seen from the comparison between FIG. 9 and FIG. 10, there is a clear formation of a PA crosslinked layer.

Example 11

The membranes from example 9 were analysed for variations in physical structure with SEM. From FIG. 11 it is clear the presence of amine vapour during synthesis has a profound effect on the physical structure.

The invention claimed is:

1. A method for the preparation of an asymmetric membrane comprising a less porous top-layer as compared to an underlying membrane structure, wherein the method comprises:
   (a) casting a solution of a first polymer, wherein the first polymer can be cross-linked by a first reactive monomer;
   (b) contacting the cast first polymer solution with a vapor or liquid phase that is not a non-solvent for the first polymer, the vapor or liquid phase comprising the first reactive monomer, wherein the first reactive monomer reacts with the first polymer at a surface of the cast first polymer solution, thus crosslinking the first polymer within an upper layer of the cast polymer solution and forming the less porous top-layer prior to solidification of the first polymer solution; and
   (c) inducing, with a non-solvent of the first polymer, a phase inversion of the cast first polymer solution in which the less porous top-layer has formed to obtain the asymmetric membrane upon solidification of the first polymer to form the underlying membrane structure, wherein crosslinking of the first polymer within the upper layer of the cast polymer solution in (b) and solidification of the first polymer in (c) are decoupled in time.

2. The method according to claim 1, wherein in (b) the upper layer is contacted with a vapor comprising the first reactive monomer.

3. The method according to claim 1, wherein in (b) the upper layer is atomised with a liquid comprising the first reactive monomer.

4. The method according to claim 1, wherein the first polymer is selected from the group consisting of polyimide, poly(vinyl alcohol), polystyrene, polybenzimidazole, sulfonated polyether ether ketone, sulfonated polyether ketone, sulfonated polysulfone, and hydrolysed polyacrylonitrile, and wherein the crosslinking of the first polymer in (b) by the first reactive monomer is of an ionic or a covalent nature.

5. The method according to claim 1, wherein the first polymer solution further comprises a second reactive monomer that can react with the first reactive monomer thus forming a second polymer within the upper layer of the cast polymer solution.

6. The method according to claim 1, wherein the first reactive monomer is selected from the group consisting of 1,2-diaminoethane, 1,3-diaminopropane, diaminobutane, diaminopentane, diaminohexane, diaminoheptane, diaminooctane, diaminononane, diaminodecane, N,N'-dimethylethylenediamine, N,N'-diethylethylenediamine, diethylenetriamine, triethylenetetraamine, tetraethylenepentaamine, pentaethylenehexamine, tris(2-aminoethyl)amine, polyethyleneimine, polyallylamine, polyvinylamine, polyether diamines based predominantly on a polyethylene oxide backbone with a molecular weight of 50 to 20,000, trimethoxysilylpropyl- substituted polyethyleneamine having a molecular weight of 1,000 to 200,000, m-xylylenediamine, p-xylylenediamine, multifunctional aniline derivatives, phenylenediamines, methylenedianiline, oxydianiline, gluteraldehyde, formaldehyde, glyoxal, terphthaldehyde, acrolein, methacrolein, urea formaldehyde/$H_2SO_4$, citric acid, maleic acid and anhydride, maleic anhydride copolymers with vinyl methyl ether, maleic acid, malonic acid, fumaric acid, poly(acrylic acid), trimesic acid, trimesoyl chloride, toluene diisocyanate, glycidyl acrylate, divinyl sulphone, boric acid, 1,2-dibromoethane, tetraethoxysilane, y-glycidoxypropyltrimethoxysilane and y-mercaptopropyltrimethoxysilane.

7. The method according to claim 1, wherein the first reactive monomer and the first polymer can form a polyamide.

8. The method according to claim 5, wherein the second reactive monomer does not react with the first polymer.

9. The method according to claim 5, wherein the first reactive monomer is an amine or a thiol and the second reactive monomer is an acid chloride, epoxide or alkene.

10. The method according to claim 1, wherein the first reactive monomer is an acid chloride, epoxide or alkene and the second reactive monomer is an amine or a thiol.

11. The method according to claim 1 wherein the asymmetric solidified membrane obtained in (c) is subsequently immersed in a solvent exchange medium comprising a solvent in which a suitable cross-linker is solubilized.

12. The method according to claim 11, wherein in (c) a still liquid polymer film is immersed in a solution comprising a non-solvent for the membrane forming first polymer in which a membrane polymer cross-linker is dissolved.

13. A method for the preparation of an asymmetric membrane comprising a top-layer and a membrane structure underlying the top-layer, the method comprising:
  (a) casting a solution of a first polymer, wherein the first polymer can be cross-linked by a first reactive monomer;
  (b) contacting a surface of the cast first polymer solution with a vapor or liquid phase that is not a non-solvent for the first polymer, the vapor or liquid phase comprising the first reactive monomer, wherein the first reactive monomer reacts with the first polymer at the surface of the cast first polymer solution, thus crosslinking the first polymer within an upper layer of the cast polymer solution and forming the top-layer prior to solidification of the first polymer solution; and
  (c) inducing, with a non-solvent of the first polymer, a phase inversion of the cast first polymer solution in which the top-layer has formed, to obtain the asymmetric membrane upon solidification of the first polymer to form the underlying membrane structure, whereby the top-layer is less porous than the membrane structure underlying the top-layer, and wherein cross-linking of the first polymer within the upper layer of the cast polymer solution in (b) and solidification of the first polymer in (c) are decoupled in time.

* * * * *